United States Patent [19]

Flamme et al.

[11] Patent Number: 6,009,354
[45] Date of Patent: Dec. 28, 1999

[54] ENHANCED IMPLEMENT CONTROL

[75] Inventors: David D. Flamme, Hinsdale; Paul W. Haack, Crystal Lake; Aly M. El-Dars, Oakbrook Terrace, all of Ill.

[73] Assignee: Case Corporation, Racine, Wis.

[21] Appl. No.: 08/935,998

[22] Filed: Sep. 23, 1997

[51] Int. Cl.$^6$ .............................. G06F 19/00; G06G 7/66
[52] U.S. Cl. ........................... 700/184; 700/171; 700/174; 701/50; 172/4.5; 172/7
[58] Field of Search ........................ 364/474.26, 474.13, 364/474.16; 701/50; 172/4.5, 7; 700/184, 171, 174

[56] References Cited

U.S. PATENT DOCUMENTS

| | | | |
|---|---|---|---|
| 3,762,603 | 10/1973 | Bauman et al. | 221/211 |
| 3,848,552 | 11/1974 | Bauman et al. | 111/77 |
| 3,860,146 | 1/1975 | Bauman et al. | 221/211 |
| 3,885,704 | 5/1975 | Lienemann et al. | 221/211 |
| 4,013,875 | 3/1977 | McGlynn | 235/150.2 |
| 4,148,414 | 4/1979 | Parks, Jr. | 221/278 |
| 4,296,409 | 10/1981 | Whitaker et al. | 340/684 |
| 4,333,096 | 6/1982 | Jenkins et al. | 340/684 |
| 4,365,672 | 12/1982 | Robinson, Jr. et al. | 172/2 |
| 4,381,036 | 4/1983 | Fardal et al. | 172/2 |
| 4,413,685 | 11/1983 | Gremelspacher et al. | 172/316 |
| 4,467,872 | 8/1984 | Hodapp | 172/126 |
| 4,488,476 | 12/1984 | Diel et al. | 91/513 |
| 4,523,280 | 6/1985 | Bachman | 364/424 |
| 4,530,463 | 7/1985 | Hiniker et al. | 239/71 |
| 4,653,410 | 3/1987 | Typpi | 111/1 |
| 4,721,168 | 1/1988 | Kinzenbaw | 172/311 |
| 4,747,301 | 5/1988 | Bellanger | 73/117.3 |

(List continued on next page.)

OTHER PUBLICATIONS

PCT Form/ISA/220; International Search Report for Application PCT/US98/19668; May 11,1999.
Operators Manual, 955 Planter Cyclo Air 12/23 Solid Row Crop Front Fold, Rac 9–29280, Case Corporation, Dec. 1996, 14 excerpts.
Drills 5400 and 5500 Soybean Special Pamphlet, No. AE 174086, Case Corporation, 1996, 1 page.
Early Riser 955 Series Cyclo Air Planters Pamphlet, No. AE 17086, Case Corporation, 1996, 1 page.
Early Riser Cyclo Air and Plate Planters, RC Cultivators and Hoes Pamphlet, No. AE 101055, Case Corporation, 1995, 2 pages.

Primary Examiner—Paul P. Gordon
Assistant Examiner—Ramesh Patel
Attorney, Agent, or Firm—Foley & Lardner

[57] ABSTRACT

A sectional rate control unit for an agricultural implement is disclosed herein. The sectional rate control unit is preferably used with a planting system including a planting implement coupled to a work vehicle. The implement includes a frame having at least one section supporting multiple row units which are configured to apply a product (e.g., seed, fertilizer, insecticide, herbicide) to the rows in a field. Each section includes a product delivery apparatus having a target delivery rate controlled by a section application control signal and at least one product channel for delivering an amount of the product to each of the row units. The control unit includes an electronic product sensor coupled to each of the sections and the product channel. The product sensor is configured to generate a product rate signal representative of the amount of the product delivered to the row units. An electronic display located in the cab is configured to generate an image in response to a display signal. The display includes operator-actuatable switches configured to independently control the state of each of the sections and the target delivery rate of each product for each of the sections. A processor circuit is configured to monitor the product rate signal from each product sensor, to calculate product rate data for each product sensor, to generate and apply a display signal to the electronic display to generate the image on the display representing the product rate data for each product in each section, and to generate and apply the section application control signal to each product delivery apparatus in response to actuations of the switches on the electronic display.

20 Claims, 20 Drawing Sheets

U.S. PATENT DOCUMENTS

| | | | |
|---|---|---|---|
| 4,803,626 | 2/1989 | Bachman et al. | 364/424.07 |
| 5,025,951 | 6/1991 | Hook et al. | 221/13 |
| 5,220,876 | 6/1993 | Monson et al. | 111/130 |
| 5,232,054 | 8/1993 | Van Blaricon et al. | 172/311 |
| 5,260,875 | 11/1993 | Tofte et al. | 364/424.07 |
| 5,424,957 | 6/1995 | Kerkhoff et al. | 364/479 |
| 5,431,117 | 7/1995 | Steffens et al. | 111/180 |
| 5,488,817 | 2/1996 | Paquet et al. | 56/10.2 R |
| 5,498,929 | 3/1996 | Formwalt, Jr. | 364/510 |
| 5,574,657 | 11/1996 | Tofte et al. | 364/510 |
| 5,581,235 | 12/1996 | Hoolstein | 340/477 |
| 5,598,794 | 2/1997 | Harms et al. | 111/117 |
| 5,605,105 | 2/1997 | Clark et al. | 111/127 |
| 5,621,666 | 4/1997 | O'Neall et al. | 364/555 |
| 5,635,911 | 6/1997 | Landers et al. | 340/674 |
| 5,646,846 | 7/1997 | Bruce et al. | 364/424.07 |
| 5,809,440 | 9/1998 | Beck et al. | 701/50 |

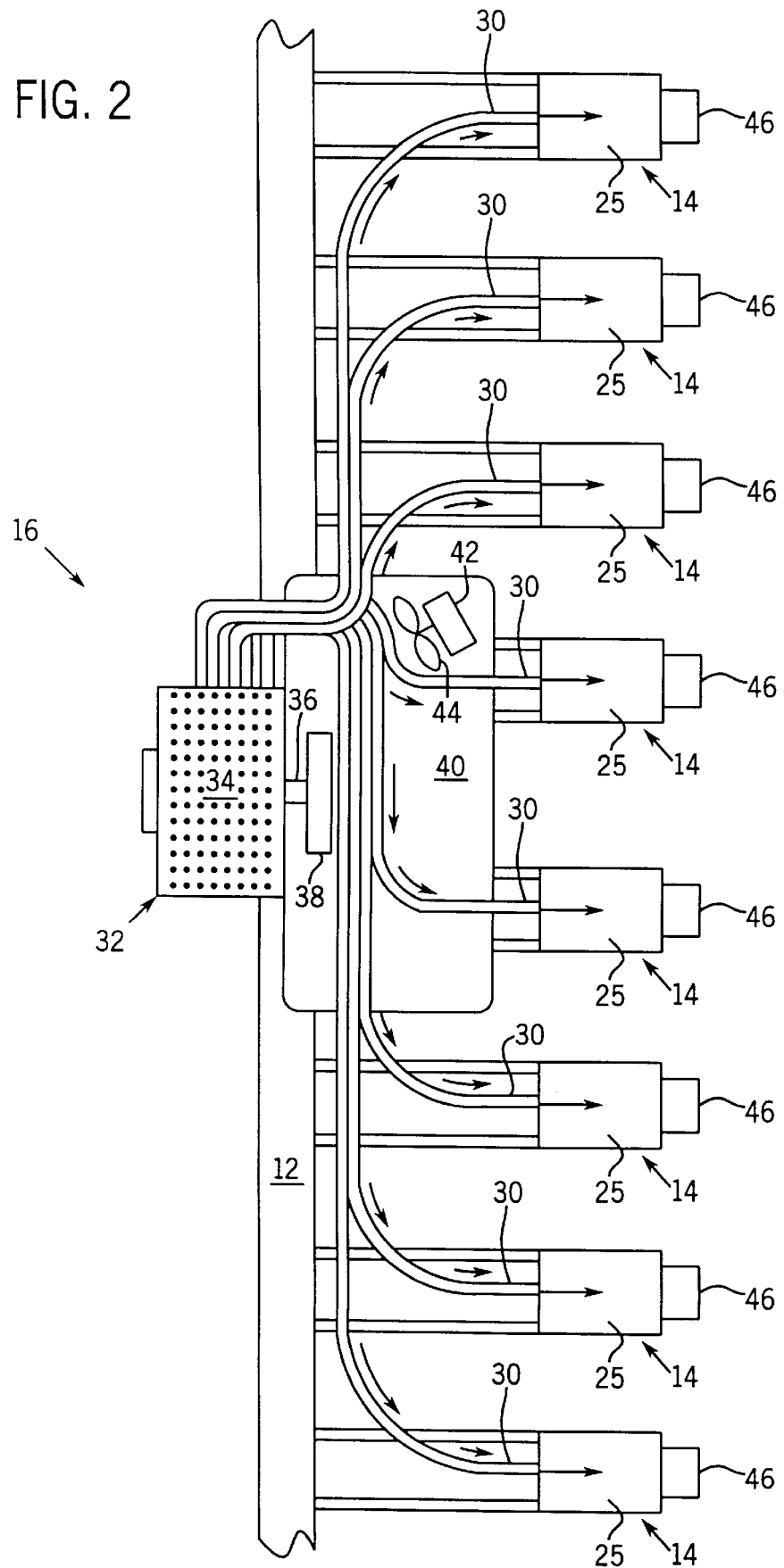

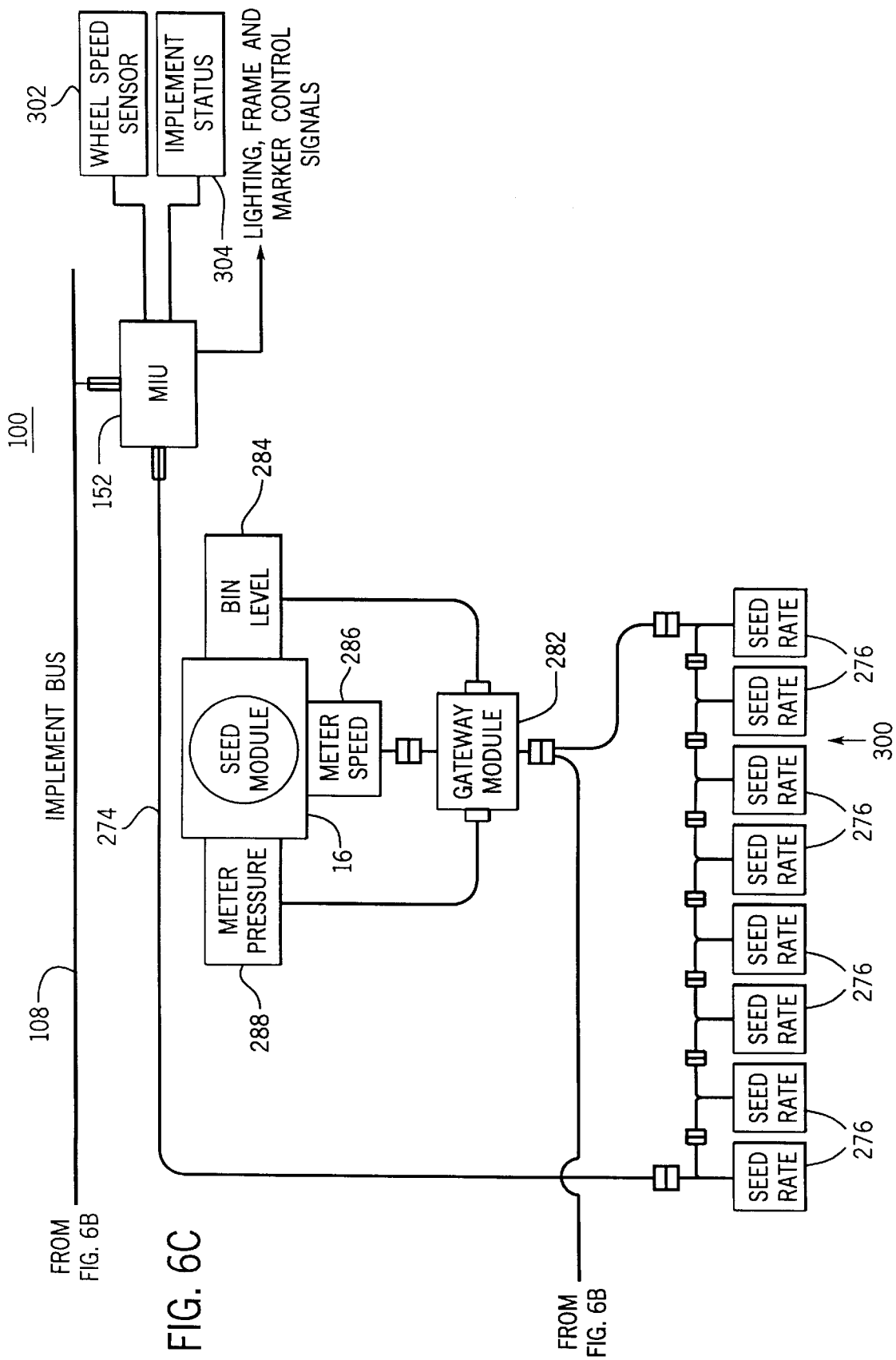

FIG. 9A

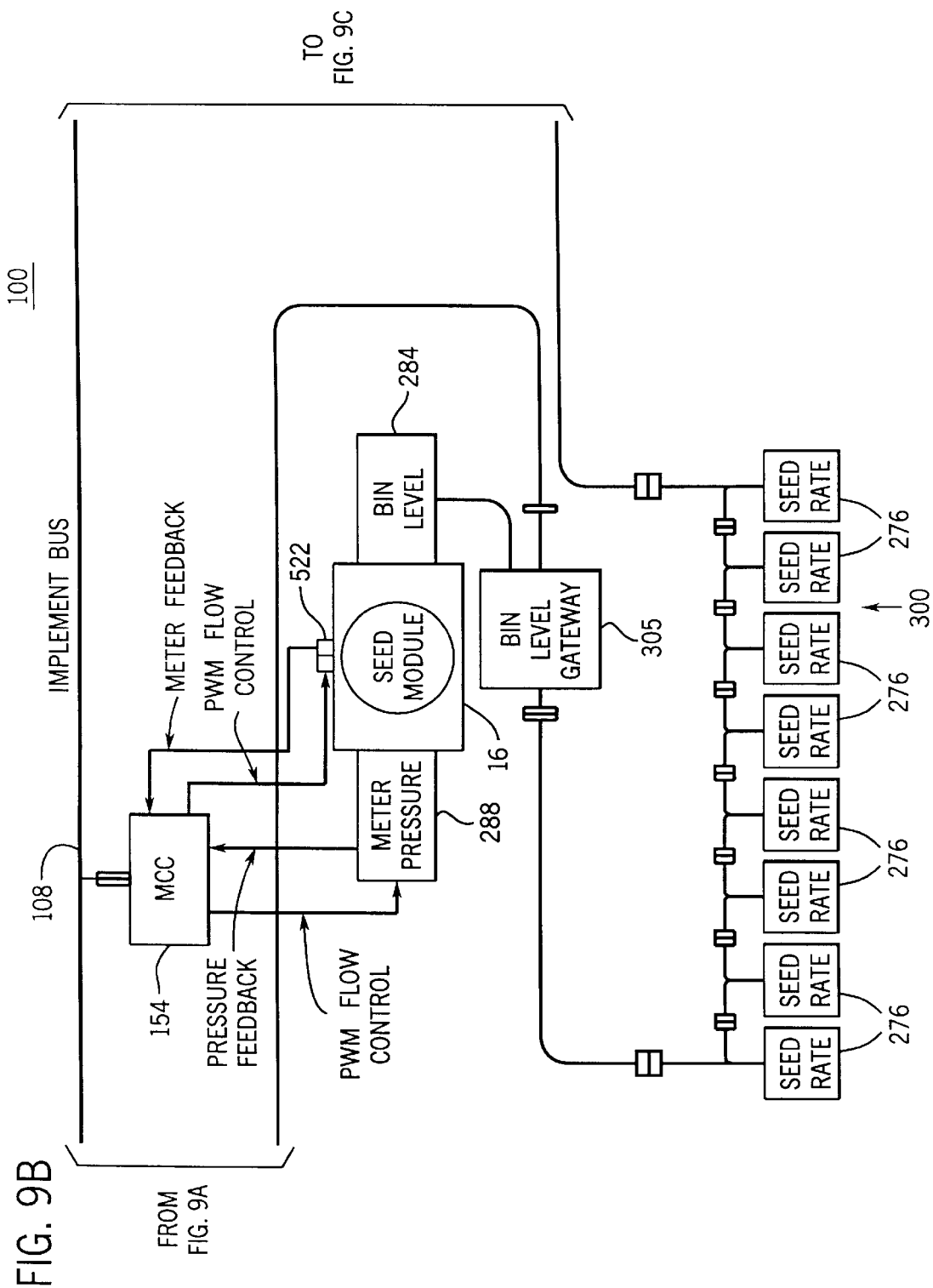

ENHANCED IMPLEMENT CONTROL

FIELD OF THE INVENTION

The present invention generally relates to monitoring and controlling the application of a product to a field in an agricultural system. In particular, the invention relates to monitoring actual and target product application rates in an implement, controlling the target product application rates for each product being applied to a field, controlling the status of each of the sections which supports multiple row units responsible for delivering the product to the field, and displaying the actual product application rates for each product, the target product application rates for each product and the status of each of the sections for viewing by the operator of the implement.

BACKGROUND OF THE INVENTION

Planting implements such as planters and drills are used for planting seed in agricultural fields. Planting implements include a frame having one or more sections. Each section supports multiple row units configured to apply seeds to a field as the implement is pulled across the field by an agricultural vehicle (e.g., a wheeled or tracked tractor). Seeds are stored in a seed bin mounted on or pulled behind the implement. Planters and drills often include additional systems for applying granular or liquid fertilizer, insecticide or herbicide to the field.

Planters include meters configured to dispense or meter individual seeds to row units. In contrast, drills use fluted rolls to meter a mass or volume of seed. The metering and placement accuracy is typically higher for planters than drills. Seeds of crops (e.g., corn) which require relatively accurate metering and placement for efficient growth are typically planted using planters, and seeds of crop which grow efficiently in more varied environments (e.g., oats; wheat) are planted by less accurate and less expensive drills.

Many planters and drills are made by Case Corp., the assignee of this invention. For example, the 955 Series EARLY RISER CYCLO AIRS Planters have central-fill seed bins for storing seed, pressurized air metering systems including cyclo seed drums for metering seed, and air distribution systems for delivering the metered seed to the row units. Planters in this series plant different numbers of rows at different row widths. For example, a 12/23 Solid Row Crop (SRC) Cyclo Planter plants 23 narrow rows or 12 wide rows when every other row unit is locked up. Drills made by Case Corp. include the 5300, 5400, 5500, 7100 and 7200 drills which include different numbers of openers, opener spacings and seeding widths. The 5500 Soybean Special Grain Drill, for example, includes 24 openers, 5 inch spacings and a 30 foot width.

Planting implements such as those described above may be equipped with variable-rate controllers permitting the operator to plant seed at target seed planting rates. Such implements may further be equipped with monitors, whether integral with or separate from the controllers, for displaying theoretical or estimated planting rates. An example of such a controller is available on the 955 Series Planters discussed above, and examples of such monitors are the Seed Flow II and Early Riser monitors sold by Case Corp. The seed planting rates are estimated because the above-described controllers and monitors do not include mechanisms or systems to count the seeds actually planted. Rather, the rates are estimated based upon known parameters such as the meter constant (i.e., seeds per metering drum revolution), meter rotation speed, row width and distance traveled. Depending on the condition and adjustments of the planting implement, however, estimated seed planting rates may deviate substantially from the actual planting rates. Additionally, the operator is not able to easily control the target seed planting rates for each section on the implement.

To alert the operator to conditions causing errors between the desired and actual seed planting rates, it would be desirable to provide a planting implement having a system for monitoring the actual seed planting rates by counting seeds actually planted, and for displaying data representative of such planting rates. It would also be desirable to allow an operator to independently control the state of each of the sections and the target delivery rate of several different products associated with each of the sections on the implement. It would also be desirable to display the product application rate data for each row in each section in a format easily understood by the operator for determining whether each row is operating at an actual planting rate consistent with the desired planting rate. For sections having multiple row units, it would also be desirable to display average planting rate data for the row units in each section. Based on such displayed data, the operator can make appropriate adjustments or repairs to the planting implement to maximize the performance of the system.

SUMMARY OF THE INVENTION

One embodiment of the invention provides a product application control unit for an agricultural implement coupled to a work vehicle. The work vehicle includes a cab and the implement includes a frame having at least one section supporting multiple row units. The implement applies at least one product to a number of rows in a field. The control unit includes a product delivery apparatus including a target delivery rate controlled by an application control signal and at least one product channel for delivering an amount of the product to each of the row units in each section. An electronic product sensor generates a product rate signal representative of the amount of product delivered to the row units. An electronic display located in the cab generates an image in response to a display signal. A processor circuit monitors the product rate signal from each product sensor, calculates product rate data for each product sensor, generates and applies the display signal to the electronic display to generate the image on the display representing the product rate data for each product, and generates and applies the application control signal to each product delivery apparatus in response to actuations of multiple switches on the electronic display. The application control signal independently controls the target delivery rate of each product for each section.

Another embodiment of the invention provides a sectional rate control unit for an agricultural implement coupled to a work vehicle. The work vehicle includes a cab and the implement includes a frame having at least one section supporting multiple row units. The implement applies at least one product to a number of rows in a field. Each section includes a product delivery apparatus having a target delivery rate controlled by a section application control signal and at least one product channel for delivering an amount of the product to each of the row units. The control unit includes an electronic product sensor which generates product rate signal representative of the amount of product delivered to the row units. An electronic display located in the cab generates an image in response to a display signal. The display includes multiple operator-actuatable switches configured to independently control the state of each section and the target delivery rate of each product for each section.

A processor circuit monitors the product rate signal from each product sensor, calculates product rate data for each product sensor, generates and applies a display signal to the electronic display to generate the image on the display representing the product rate data for each product in each section, and generates and applies the section application control signal to each product delivery apparatus in response to actuations of the switches on the electronic display.

Another embodiment of the invention provides a method of independently controlling the amount of at least one product delivered to at least one section of an agricultural implement. The implement is connected to a work vehicle having a cab. The implement includes multiple row units and each section includes a product delivery apparatus having a target product delivery rate controlled by a section application control signal and at least one product channel for delivering an amount of the product to each of the row units. The method includes sensing the amount of the product moving through the product channel and generating a product rate signal representative thereof, monitoring the product rate signal to determine an actual product delivery rate for each section based upon the amount of the product moved and the distance the implement travelled while the product was delivered to a field, generating a display signal representative of the actual product delivery rate of each product for each section and applying the display signal to an electronic display located in the cab to generate an image on the display representative of the actual product delivery rate, generating the section application control signal which independently controls the target product delivery rate for each section in response to actuations of a plurality of switches on the electronic display, and applying the section application control signal to each product delivery apparatus to adjust the target delivery rate of each product for each section.

BRIEF DESCRIPTION OF THE DRAWINGS

The invention will become more fully understood from the following detailed description, taken in conjunction with the accompanying drawings, wherein like reference numerals refer to like parts, in which:

FIG. 2 is a schematic diagram illustrating a section of the planting implement of FIG. 1 which includes eight row units and a cyclo seed metering device configured to meter seed and deliver the metered seed to the row units;

DETAILED DESCRIPTION OF THE PREFERRED EMBODIMENTS

Figure 1:
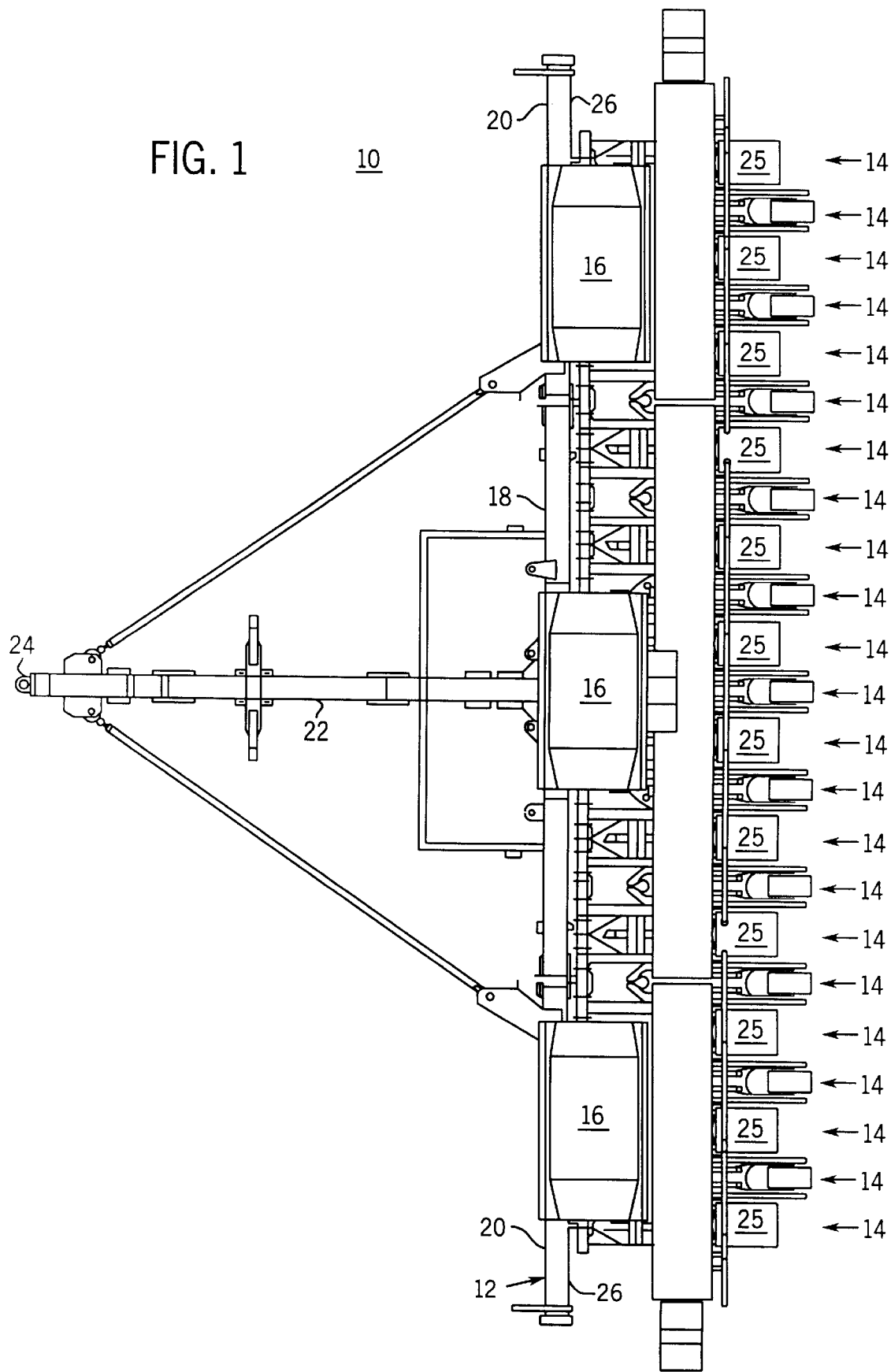
FIG. 1 is a top view of a planting implement such as a 12/23 SRC Cyclo Planter.

Referring to FIG. 1, a planting implement 10 (e.g., a 12/23 SRC Cyclo Planter) includes a support structure such as a frame 12, row units 14 mounted beneath frame 12, and seed modules 16 supported by frame 12. Frame 12 includes a middle section 18, wing sections 20 on either side of section 18, and a drawbar 22 extending forward from section 18. Wing sections 20 rotate inwardly to drawbar 22 to decrease implement width during transport. A hitch having an eye 24 attached to drawbar 22 connects to an agricultural vehicle such as a tractor (102 in FIG. 3). Twenty-three row units 14 are configured to plant seed in 23 rows of a field with all row units 14 down, or in 12 rows with every other row unit 14 locked up. Each module 16 meters seeds for row units 14 of one section. For example, the sections in FIG. 1 include 7, 8 and 8 row units 14, respectively, from left to right. Metered seeds are delivered through seed tubes (30 in FIG. 2) from modules 16 to row units 14. Bins 25 storing other products (e.g., fertilizer, insecticide or herbicide), and metering devices therefore, are also supported by frame 12. Markers attached to either side 26 of frame 12 mark the centerline of the next pass through a field.

Referring to FIG. 2, one section of implement 10 includes eight row units 14, a seed module 16 mounted on frame 12, and seed tubes 30 for moving seed from module 16 to row units 14. Seed module 16 includes a cyclo seed meter 32 for metering or singulating seed and to deliver the metered seed to row units 14. Cyclo seed meter 32 includes a perforated drum 34 secured by a shaft 36 to a hydraulic motor 38. The holes in drum 34 are arranged in circumferentially-spaced rows (e.g., 8 rows for an 8-row planter), with each row having a plurality of holes with diameters smaller than the seed being planted. The drum arrangement depends on the type of seed, and a line of interchangeable drums is made by Case Corp. A seed bin 40 stores the seed being planted. A hydraulic blower includes a hydraulic motor 42 and a fan 44 to provide pressurized air to bin 40 and to drum 34. Seeds move from bin 40 to drum 34 via a seed chute (not shown) with the aid of higher air pressure in bin 40 than drum 34.

During operation, blower 42–44 pressurizes drum 34 to create an air pressure differential above atmospheric, but lower than the air pressure in bin 40. As motor 38 rotates drum 34, the differential causes each hole to pick up one seed at the bottom of drum 34, and to retain the picked-up seed against the hole as drum 34 rotates. After further rotation moves the retained seeds above a manifold defined by openings of seed tubes 30 adjacent to drum 34, the holes are plugged by release wheels (not shown) external to drum 34 to eliminate the forces which retain the seeds and cause the seeds to drop into tubes 30. The seeds are pushed by a cushion of pressurized air through seed tubes 30 to row units 14 to be planted. A press wheel 46 compresses the soil over the planted seed.

The seed application rates depend upon ground speed and the rotation rate of drum 34. A constant application rate is obtained by driving shaft 36 via a transmission (not shown) coupled to the implement wheels. A variable application rate is obtained by controlling the rotation rate of drum 34 as a function of the ground speed (e.g., measured using implement wheel speed sensor 302 in FIG. 6) and a commanded application rate. A valve assembly (not shown) supplies pressurized hydraulic fluid to motor 38 to rotate shaft 36 at a variable rate in response to rate control signals applied to the valve assembly.

Figure 3A:
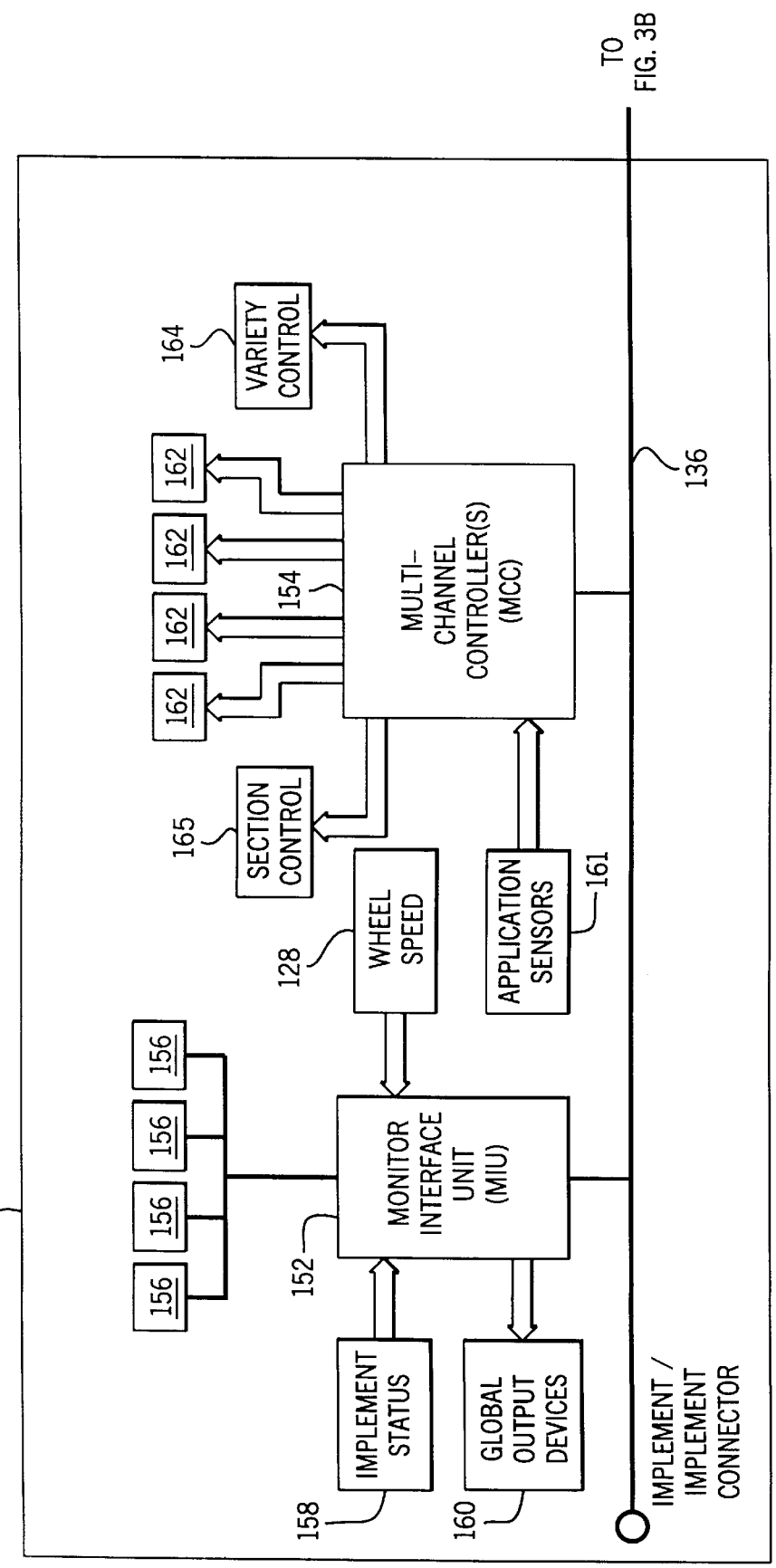
FIG. 3 is a block diagram of the control system for an agricultural vehicle and the planting implement of FIG. 1 which includes vehicle and implement data busses.
Figure 3B:
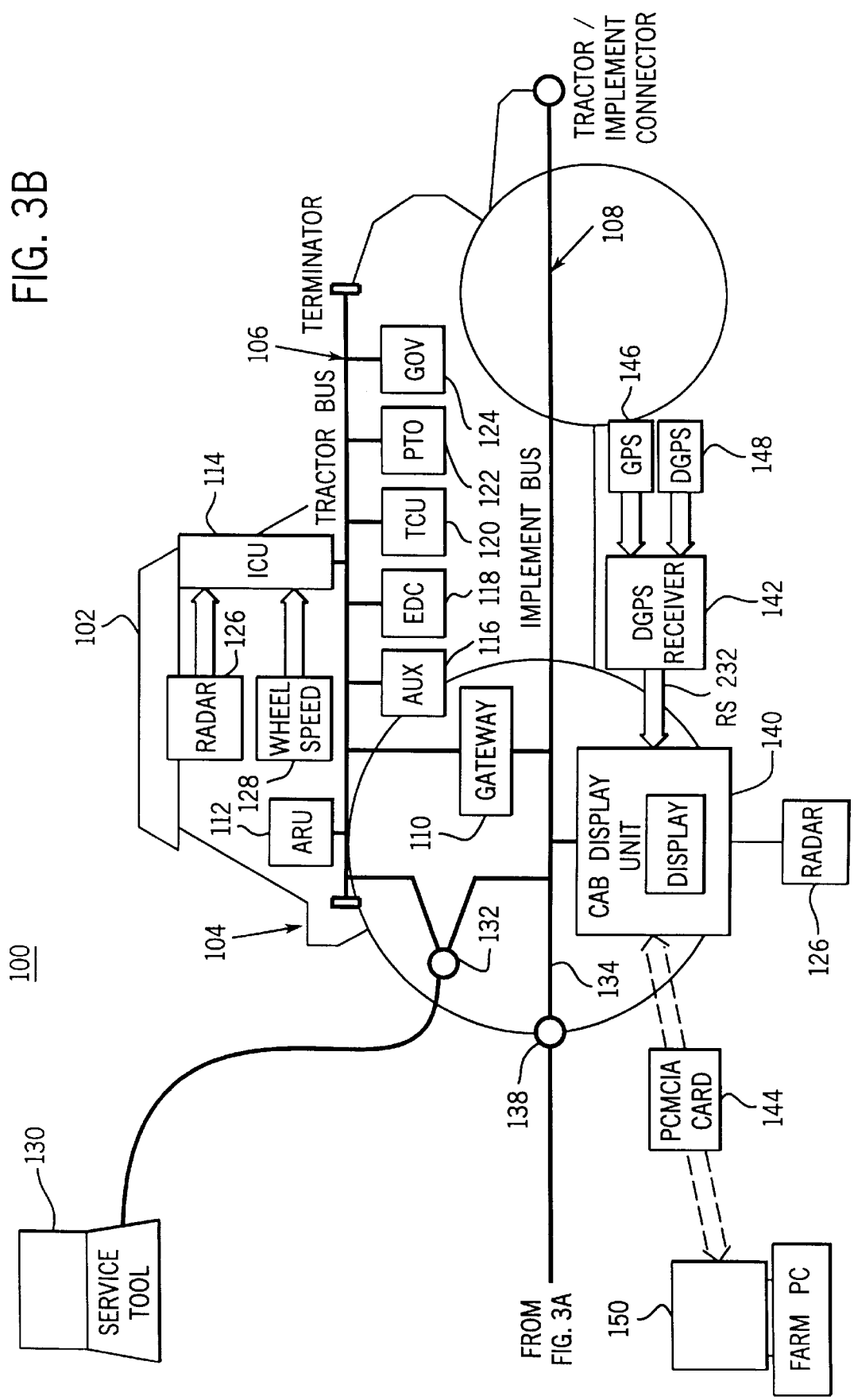

Referring to FIG. 3, a control system 100 controls planting implement 10 (e.g., a planter or drill) as it is pulled across a field by vehicle 102. Control system 100 includes electronic control units (ECUs) in communication with each other across a vehicle data bus 104. Vehicle data bus 104 includes a tractor bus segment 106 to pass data throughout vehicle 102, and an implement bus segment 108 to communicate between vehicle 102 and implement 10. Bidirectional data passes between busses 106 and 108 via a network interconnection ECU 110 (e.g., a gateway). Bus 104 preferably conforms to the "Recommended Practice for a Serial Control and Communications Vehicle Network" (SAE J-1939) which uses Controller Area Network (CAN) protocol for low-layer communications. ECU 110 performs network functions as described in the Network Layer specification of J-1939 by acting as a repeater for forwarding messages between segments 106 and 108, a bridge for filtering out messages not needed by the receiving segment, a message router for remapping addresses and a gateway to repackage messages for increased efficiency. Other bus formats, however, may also be used and ECU 110 may perform all or only a subset of the above-listed network functions.

Other ECUs coupled to tractor bus 106 include an armrest control unit (ARU) 112, instrument cluster unit (ICU) 114, auxiliary valve control unit (AUX) 116, electronic draft control unit (EDC) 118, transmission control unit (TCU) 120, power take-off control unit (PTO) 122, and engine governor control unit (GOV) 124. ICU 114 receives signals from a true ground speed sensor 126 (e.g., a radar) mounted to the body of vehicle 102. Ground speed sensor 126 (e.g., a radar) may also be in direct communication with a cab-mounted display unit (CDU) 140. A service tool 130 can be coupled to busses 106 and 108 via a diagnostic connector 132 for use during diagnostics and maintenance.

The ECUs coupled to tractor bus 106 are illustrative and other control units such as a tractor performance monitor control unit or steering control unit could also be connected to bus 106. Further, the use of gateway 110 for communications between busses 106 and 108 allows a higher level of integration in tractors equipped with a tractor data bus. However, implement bus 108 and its associated ECUs may also be used to control implements pulled by other tractors which have no tractor data bus.

Implement bus 108 includes first and second segments 134 and 136 coupled via a connector 138 at the rear of vehicle 102. Segment 134 passes through vehicle 102 and segment 136 provides a communication pathway to implement 10. Thus, implement bus 108 reduces wiring needs between implement 10 and vehicle 102. Besides gateway ECU 110, ECUs coupled to segment 134 include cab-mounted display unit (CDU) 140. CDU 140 provides an operator interface, a serial interface (e.g., RS-232) to receive positioning signals from a DGPS receiver 142, and an interface for a memory card 144 (e.g., a PCMCIA card). Receiver 142 receives GPS and DGPS signals from antennas 146 and 148. Memory card 144 transfers geo-referenced map data (e.g., prescription and application rate maps defined by GIS or Global Information System databases) between control system 100 and an external computer 150. Prescription maps include application rate commands, and application rate maps record actual (i.e., sensed) application rates.

ECUs coupled to segment 136 of implement bus 108 are mounted to frame 12 of implement 10. These ECUs include a monitor interface unit (MIU) 152 and one or more multi-channel control units (MCCs) 154. Each implement section typically includes one "local" MCC 154 to control product application rates. MIU 152 monitors application rates of products (e.g., seeds) to rows and other parameters (e.g., bin level, ground speed, wheel speed, meter pressure) based on signals generated by monitoring sensors 156, implement status devices 158 and a wheel speed sensor 128 (e.g., inductance magnetic pickup sensor) coupled to the vehicle's wheels. MIU 152 also receives global commands from CDU 140 via bus 108, generates global control signals using the global commands, and applies the global control signals to global output devices 160 to perform global implement functions (e.g., lighting, frame, marker control). MCCs 154 receive local product application rate commands from CDU 140 based on signals generated by application sensors 161, generate local control signals for local product metering devices 162, and apply the local control signals to metering devices 162. Further, MCCs 154 may generate control signals for a variety or type switch 164 which selects the variety or type of farming inputs applied. MCCs 154 may also generate control signals for a section control switch 165 which selects which sections are enabled or disabled.

Figure 4:
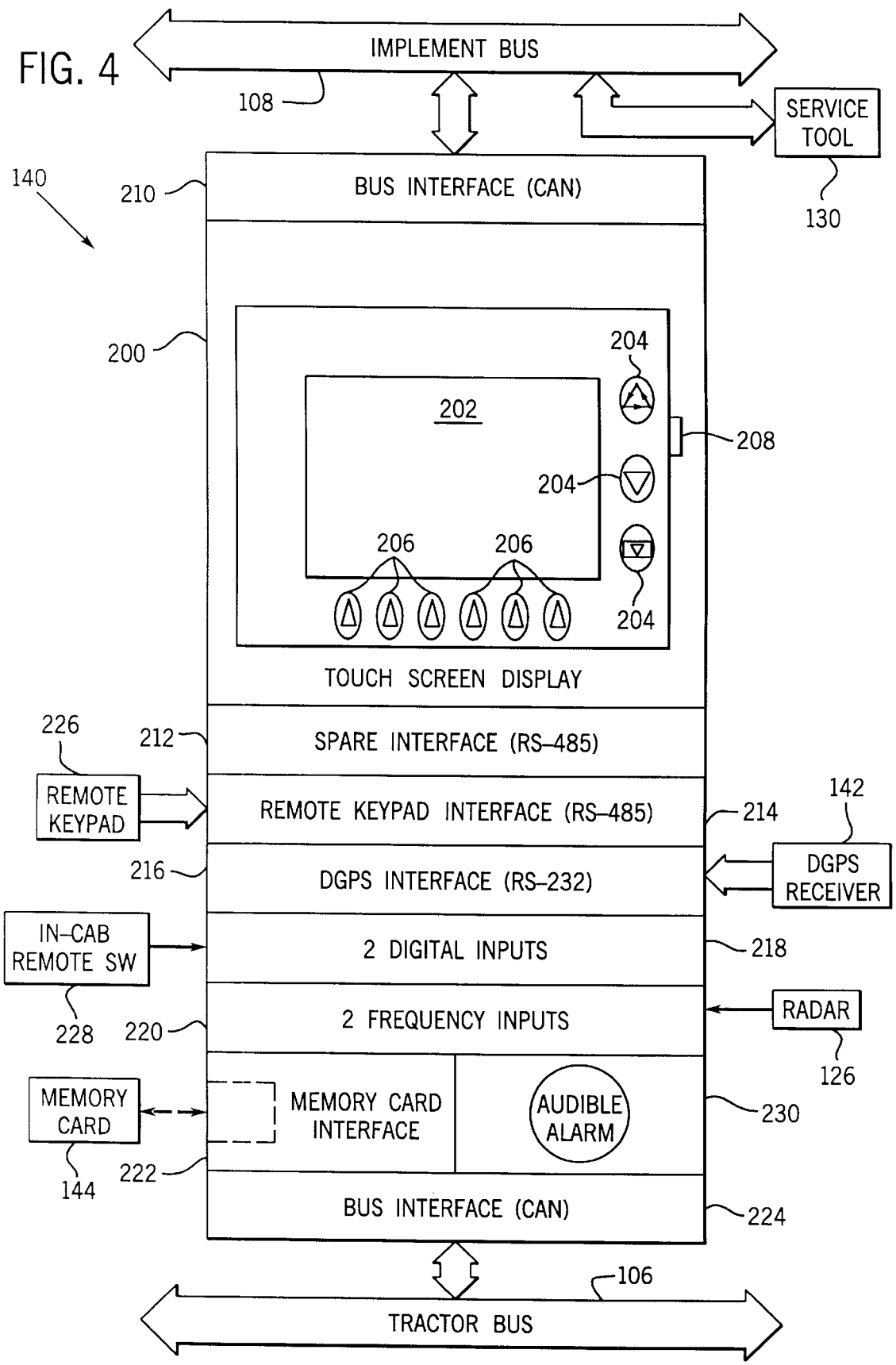
FIG. 4 is a block diagram of the cab display unit (CDU) of FIG. 3, and the interfaces between the CDU and other components of the control system.

Referring to FIG. 4, CDU 140 is an ECU mounted in the cab of vehicle 102. CDU 140 includes a display unit 200 including a touch screen 202 (e.g., a TFT 10.4" color display with digital touch screen), system touchscreen switches 204, reconfigurable touchscreen switches 206 and system reset switch 208. A ½ VGA monochrome DMTN display with LED backlighting could also be used. CDU 140 has interfaces 210–224 for implement bus 108, a remote keypad 226, DGPS receiver 142, digital inputs (e.g., an in-cab remote switch 228), frequency inputs such as radar 126, memory card 144 and tractor bus 106. CDU 140 includes an audible alarm 230. A processor (e.g., ARM LH74610 RISC processor) coupled to memory circuits (e.g., RAM, EEPROM, Flash EPROM) provides control for CDU 140.

Control system 100 can control different planting implement applications. An operator uses touch screen 202 to navigate and perform common functions within each application. System touchscreen switches 204 include a MODE switch for toggling between applications, a CALIBRATE switch for performing configuration and calibration functions, and a UTILITY switch for performing file transfers on card 144. Touchscreen switches 206 select between items on reconfigurable menus to control the operations of control system 100. Reset switch 208 resets control system 100. Remote keypad 226, mounted via a cable near the operator when CDU 140 is mounted elsewhere in the cab, duplicates touchscreen switches 206. In-cab remote switch 228 allows the operator to remotely start and stop product metering. Alarm 230 is used to alert the operator to error and alarm conditions.

Both global and local operations of implement 10 are controlled by actuations of touchscreen switches 204–206. The global functions include lighting control (e.g., turning on and off lights attached to frame 12), frame control (e.g., raising and lowering frame 12; folding and unfolding wings 20) and marker control (e.g., alternately raising and lowering markers attached to both sides 26 of frame 12 to mark the centerline of the next pass). Actuations needed to control the global functions depend on the particular implement. When switch actuations relate to lighting, frame or marker control, CDU 140 generates global command signals which are communicated to MIU 152 via bus 108 for controlling global output devices 160.

The local implement functions include variable-rate application of products to a field. Touchscreen switches 204–206 are actuated to control the rates in a manual or an automatic mode. In manual mode, the actuations set, increase or decrease the desired application rates for one or more products applied by each section. In automatic mode, the actuations select between one or more prescription maps stored on card 144. The maps include geo-referenced data representing desired application rates of one or more products at positions throughout a field. Desired rates are determined, for example, off-line using computer 150. The selected maps are indexed using positioning signals received by DGPS receiver 142 to determine the desired application rates which are then used to generate local product rate commands transmitted to MCCs 154.

Figure 5:
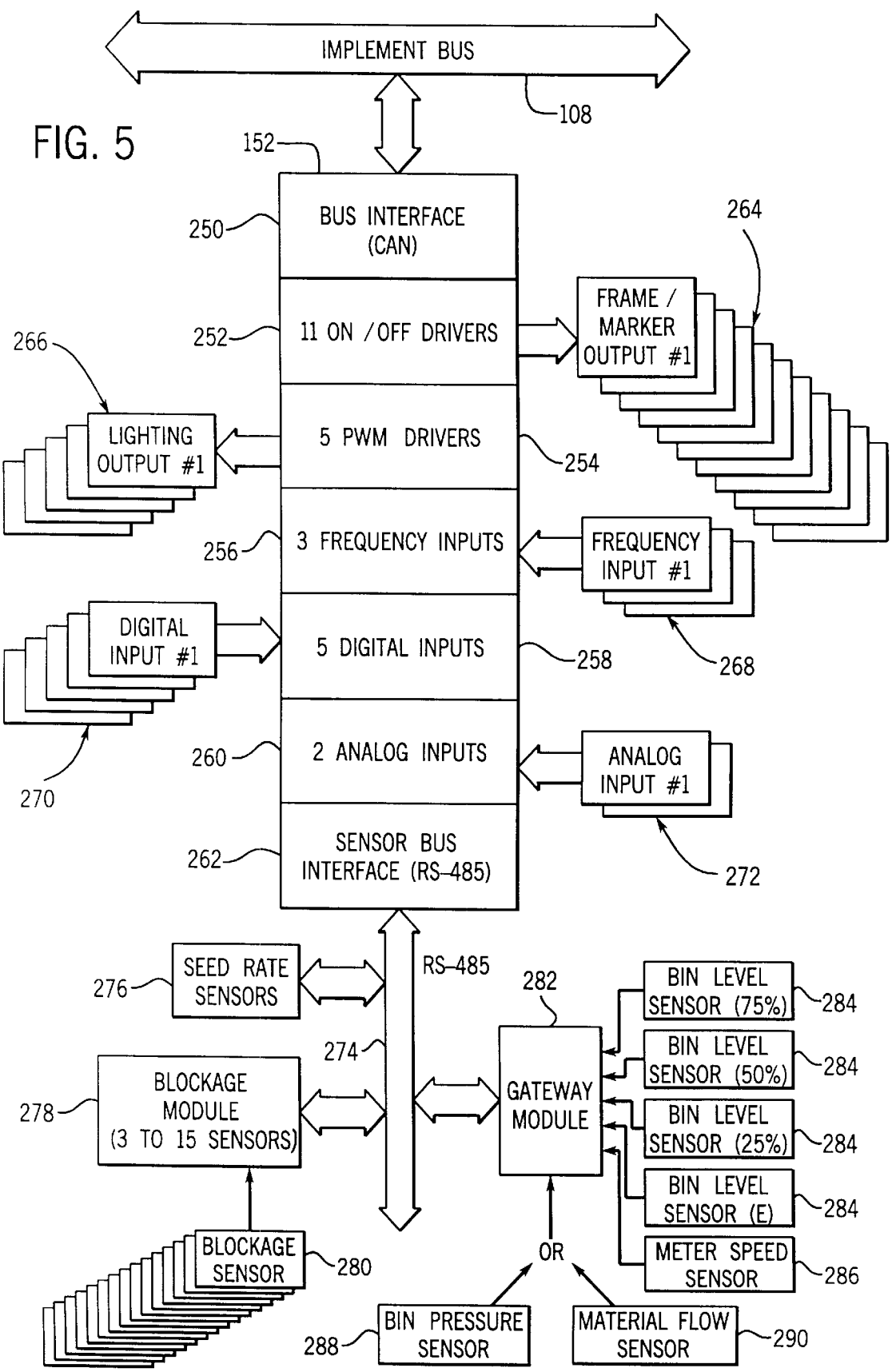
FIG. 5 is a block diagram of the monitor interface unit (MIU) of FIG. 3, and the interfaces between the MIU and other components of the control system.

Referring to FIG. 5, MIU 152 is an ECU supported on frame 12 which includes interfaces 250–262 for implement bus 108, frame/marker outputs 264 (e.g., markers; wings 20), lighting outputs 266, frequency inputs 268, digital inputs 270, analog inputs 272 and sensor bus 274. MIU 152 is connected in control system 100 as shown below. Sensor bus 274 is coupled to seed rate sensors 276, a blockage module 278 coupled to blockage sensors 280, and a gateway module 282. Optical seed rate sensors 276 detect seeds passing through seed tubes 30 to row units 14. Module 282 receives signals from optical bin level sensors 284, a meter speed sensor 286, and a bin pressure sensor 288. Signals from bin level sensors 284 indicate when bins 40 of modules 16 are 75% full, 50% full, 25% full, and Empty. Sensor bus 274 is preferably an RS-485 network as described in U.S. Pat. No. 5,635,911, herein incorporated by reference. MIU 152 is controlled by a processor (e.g., an AN80C196CB) coupled to memory (e.g., RAM, EEPROM, Flash EPROM).

Figure 6A:
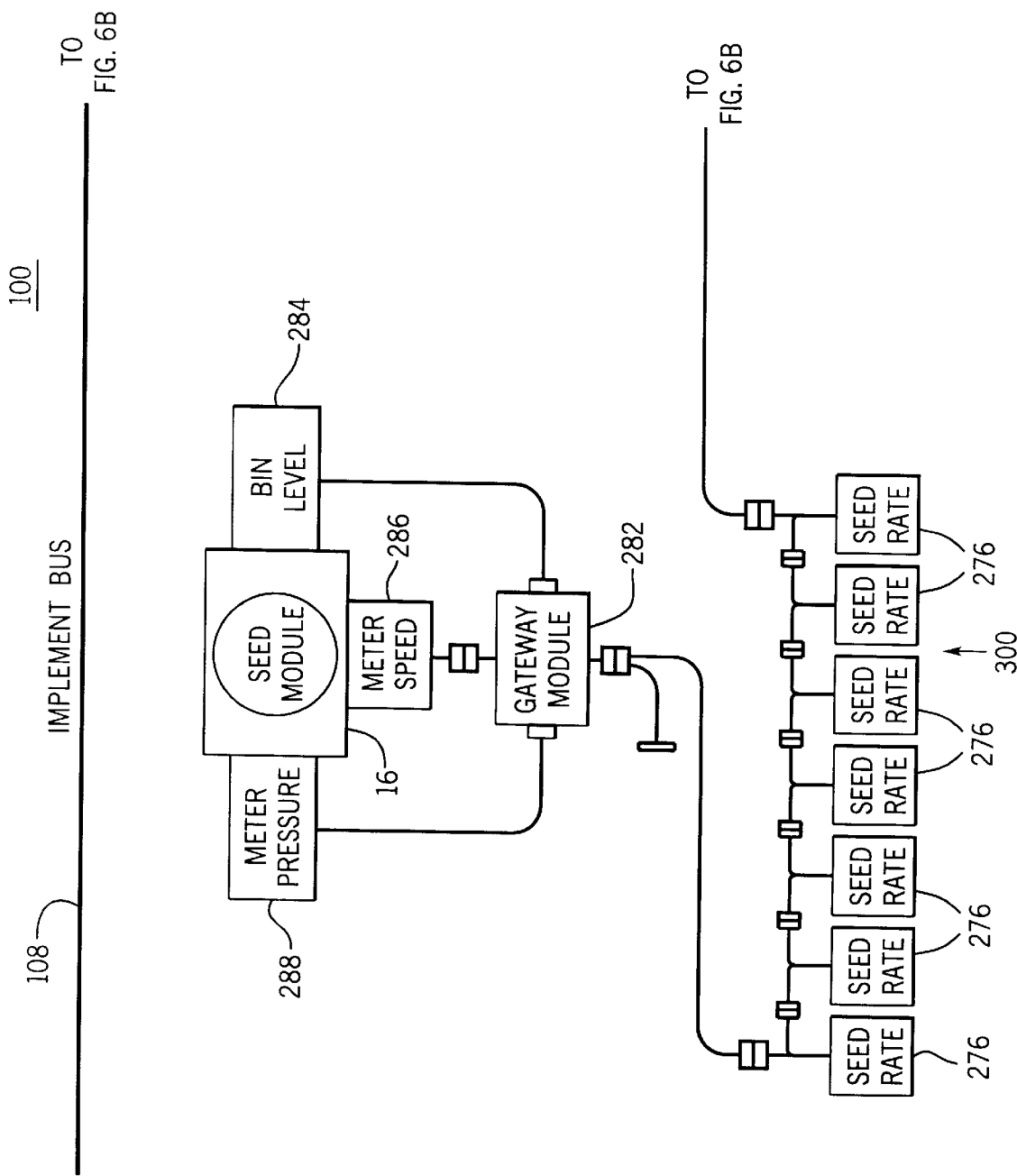
FIG. 6 is a block diagram of a control system for the planting implement of FIG. 1 including an MIU for monitoring seed rate sensors coupled to the row units.
Figure 6B:
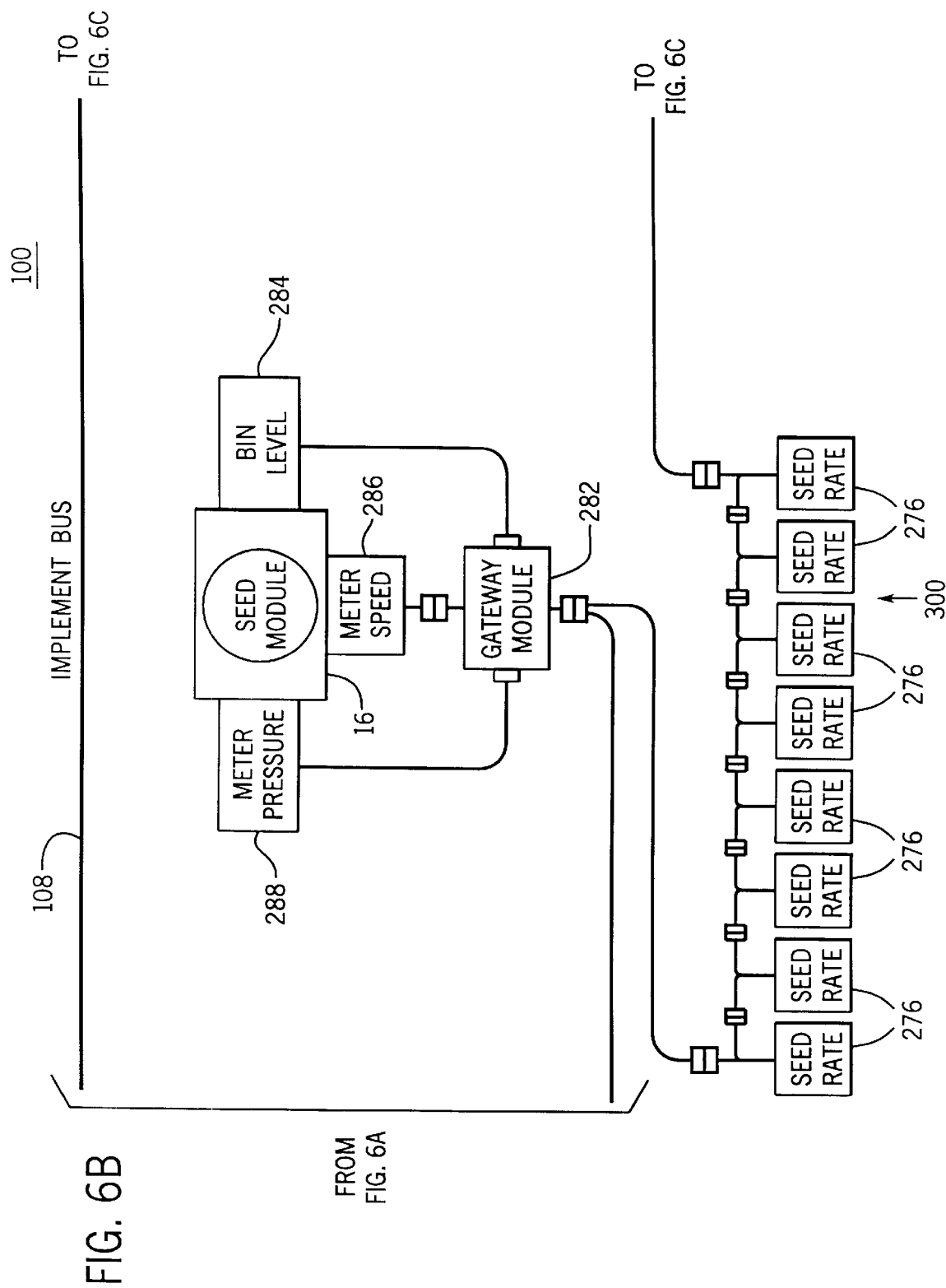
Figure 7A:
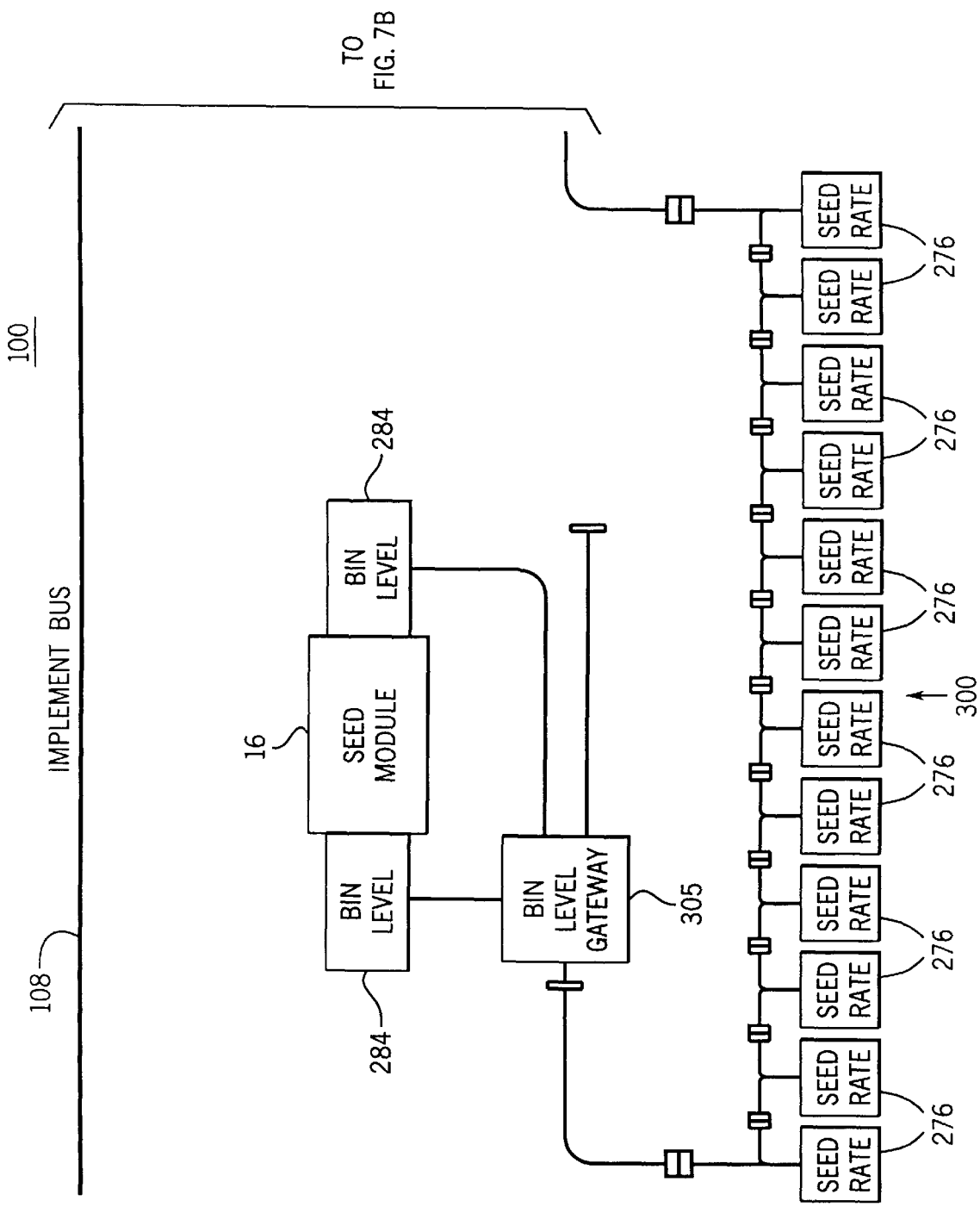
FIG. 7 is a block diagram of a control system useable with a drill planter which includes an MIU for monitoring seed rate sensors coupled to the row units.
Figure 7B:
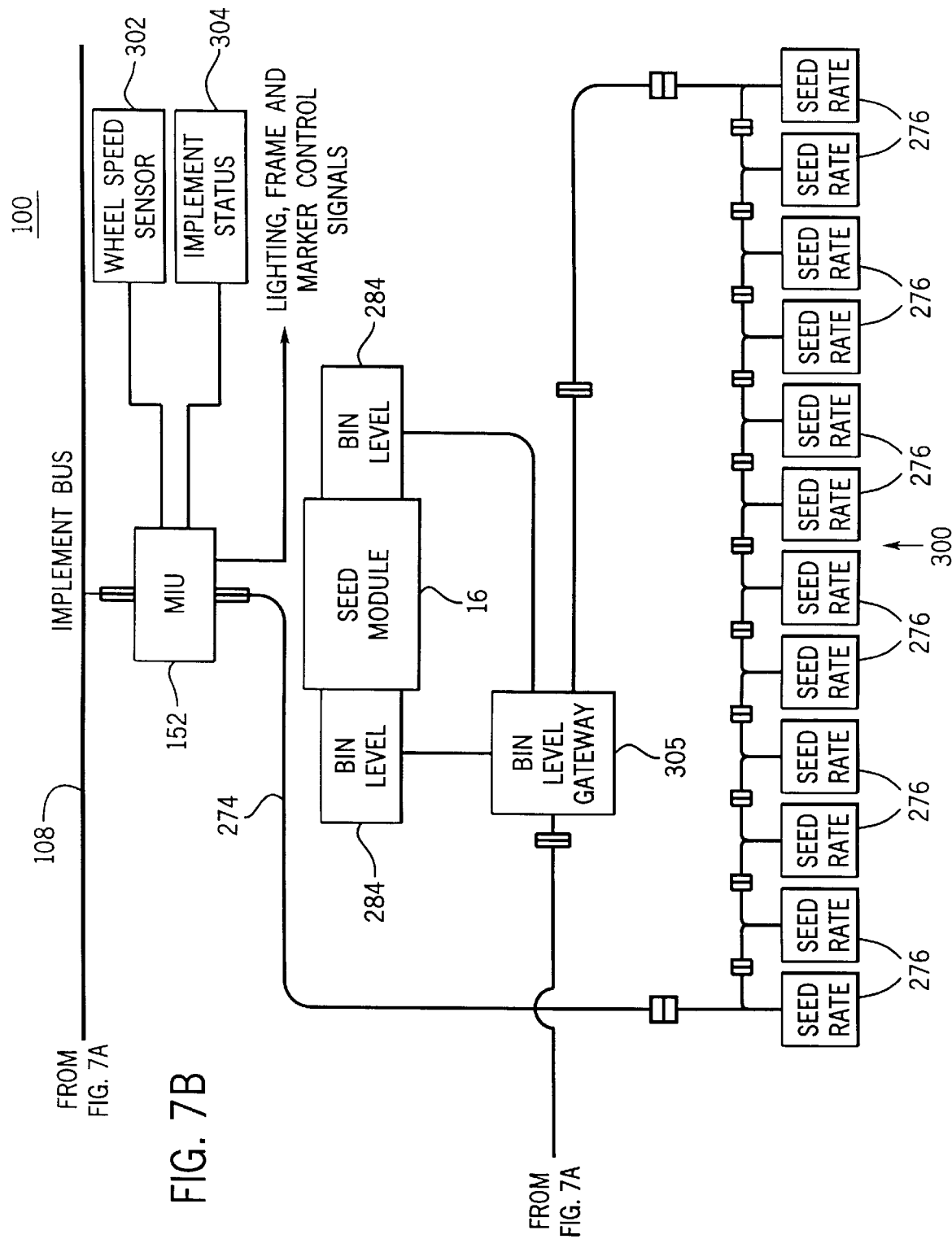
Figure 9A:
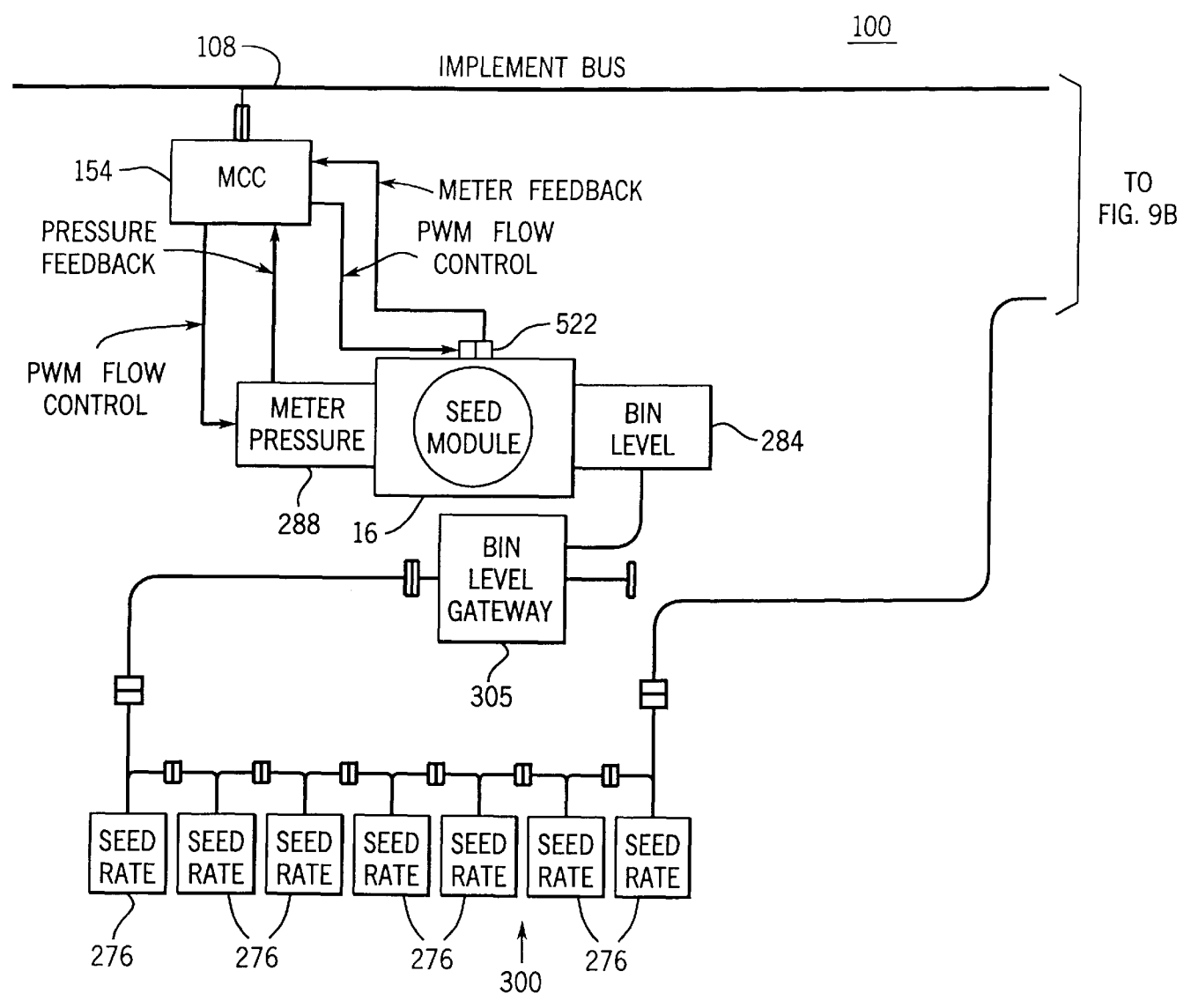
Figure 9C:
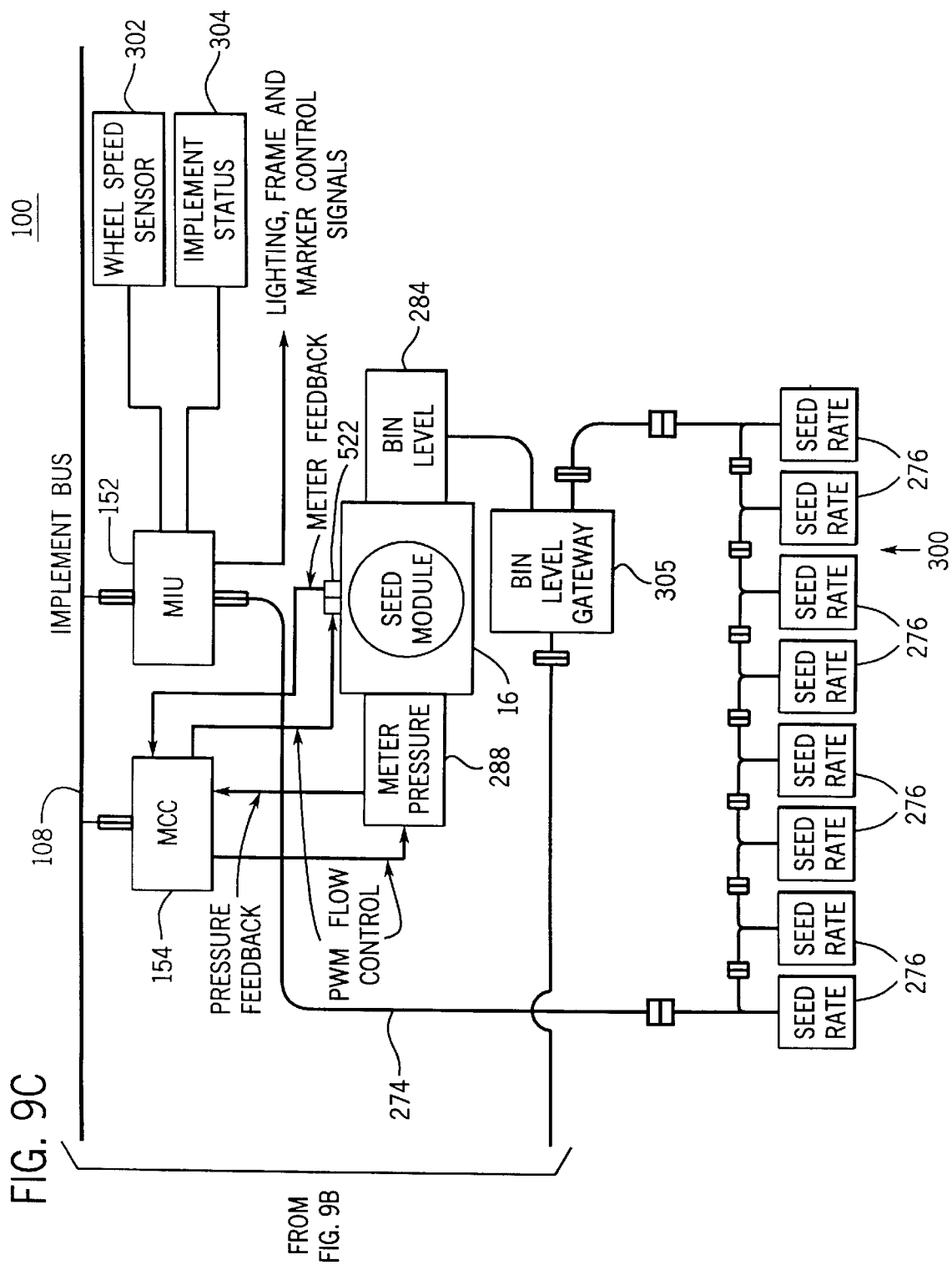
FIG. 9 is a block diagram of a control system for the planting implement of FIG. 1 which further includes local MCCs to control the planting rates of each section.
Figure 10A:
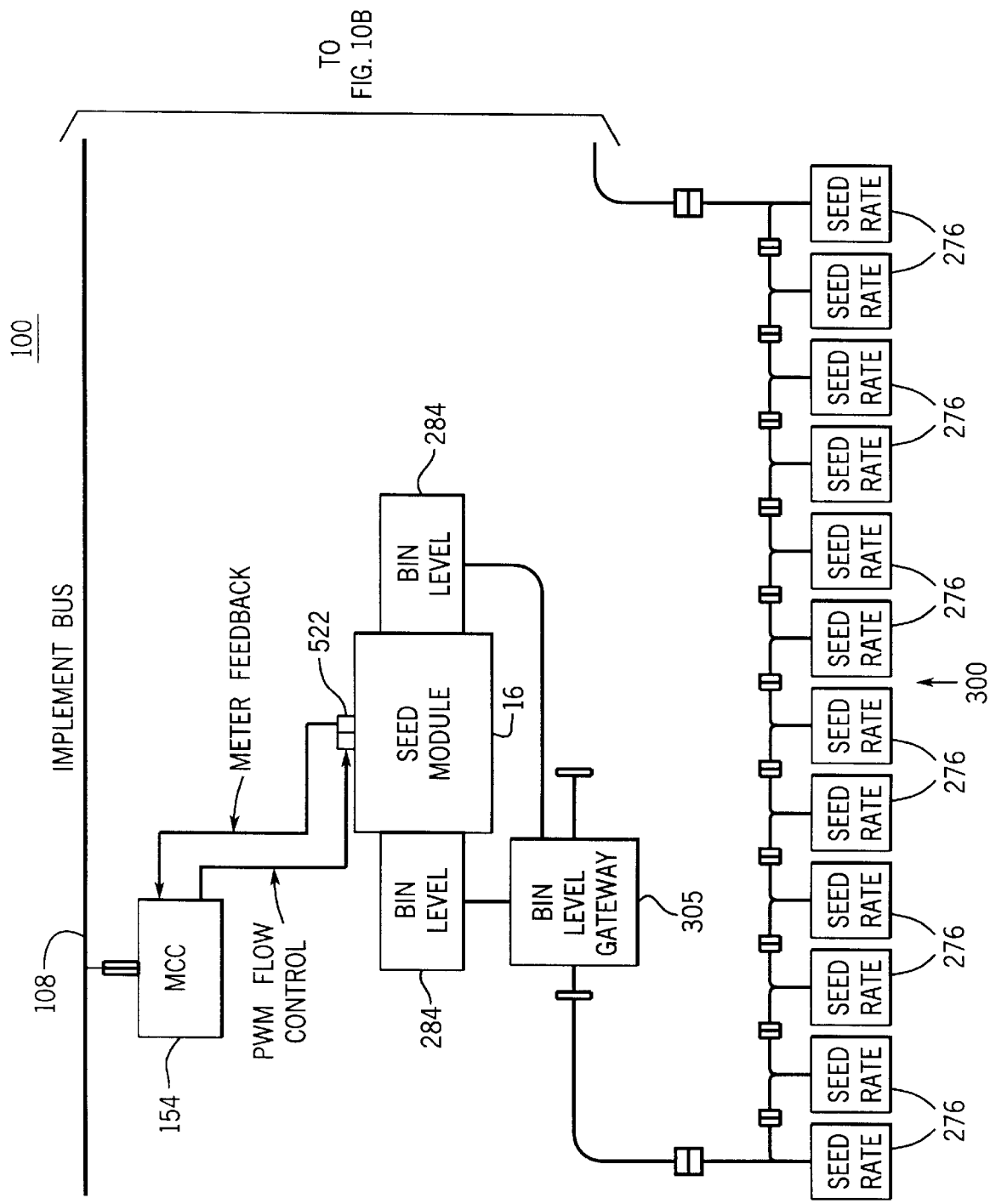
FIG. 10 is a block diagram of a control system for the drill as in FIG. 7 which further includes local MCCs to control the seed planting rates of each section.
Figure 10B:
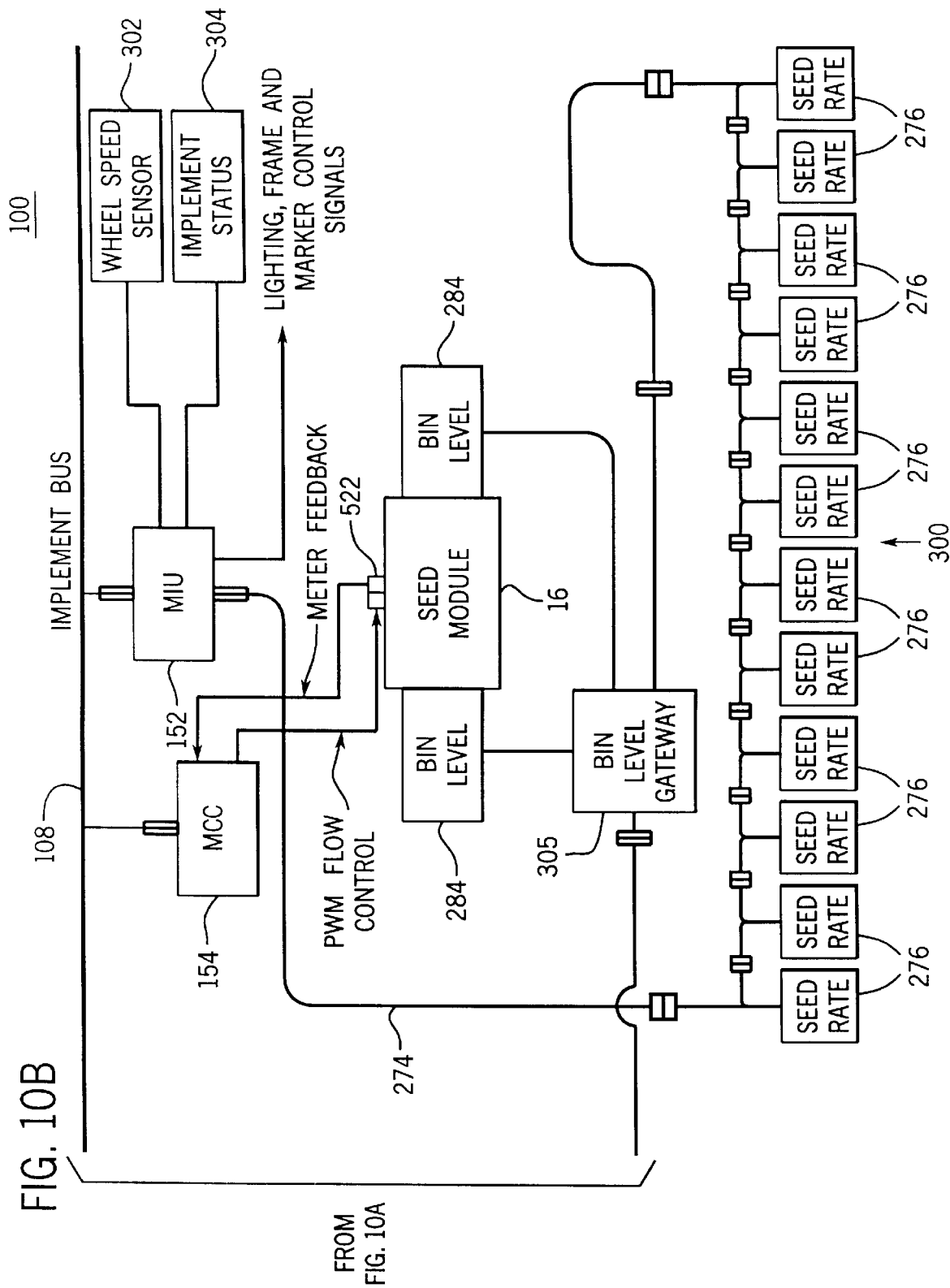

Control system 100 is a modular application control system which can be upgraded with additional controllers for expanded functionality. Initially, control system 100 includes CDU 140, implement bus 108 and MIU 152 which provide monitoring and global control functions. In the initial system, product application rates are controlled conventionally (e.g., by driving product metering devices using gears coupled to the implement wheels). FIGS. 6–7 show control system 100 in embodiments which provide for monitoring and global control functions for implements. Control system 100, however, can later be upgraded with MCCs 154 to provide variable-rate control. FIGS. 9–10 show upgraded control system 100 for the same implements.

Referring to FIG. 6, control system 100 controls a 12/23 SRC Cyclo Planter implement 10 which includes three sections 300, each supporting multiple (e.g., 7, 8 and 8) row units 14 configured to apply seeds to a field. Seeds are metered by a seed module 16 on each section 300. MIU 152 receives global command signals via bus 108 from CDU 140, and transmits back monitored data. MIU 152 receives speed signals used to calculate seeding data (e.g., area seeded) from a speed sensor 302 coupled to the planter's wheels. MIU 152 also receives signals indicating whether implement 10 is up or down from a status sensor 304. The application of products is disabled when implement 10 is raised, and is enabled with implement 10 down and ground speed above a predetermined value (e.g., 0.22 m/sec).

Sensor bus 274 is connected to a seed rate sensor 276 associated with each row unit 14. MIU 152 monitors seed application rates using signals received from seed rate sensors 276, and sends seed rate data to CDU 140 via bus 108. Bus 274 is also coupled to a gateway module 282 on each section 300 to monitor the status of each seed module 16 using signals received from bin level sensors 284, meter speed sensor 286, and bin pressure sensor 288. MIU 152 transmits meter status to CDU 140. Connectors separate MIU 152, sensors 276 and gateway modules 282.

Referring to FIG. 7, another embodiment of control system 100 is configured to control a conventional 5500 Soybean Special grain drill including two sections 300. Each section 300 supports multiple (e.g., 12 and 12) row units 14 configured to apply seeds to a field. Seeds are metered by a seed module 16 on each section 300. MIU 152 receives global command signals from CDU 140, and returns monitored data. MIU 152 also receives speed signals used to calculate seeding data from sensor 302 coupled to the drill's wheels, and receives signals indicating whether implement 10 is up or down from sensor 304. Application of products is disabled when implement 10 is raised.

Sensor bus 274 connects to a seed rate sensor 276 associated with each row unit 14. MIU 152 monitors seed application rates using signals received from sensors 276, and sends seed rate data to CDU 140. Bus 274 is also coupled to bin level gateway modules 305 which monitor and receive bin level signals from bin level sensors 284 on each section 300. Bin status data is transmitted to CDU 140 and connectors separate MIU 152 and sensors 276 and 284.

Figure 8:
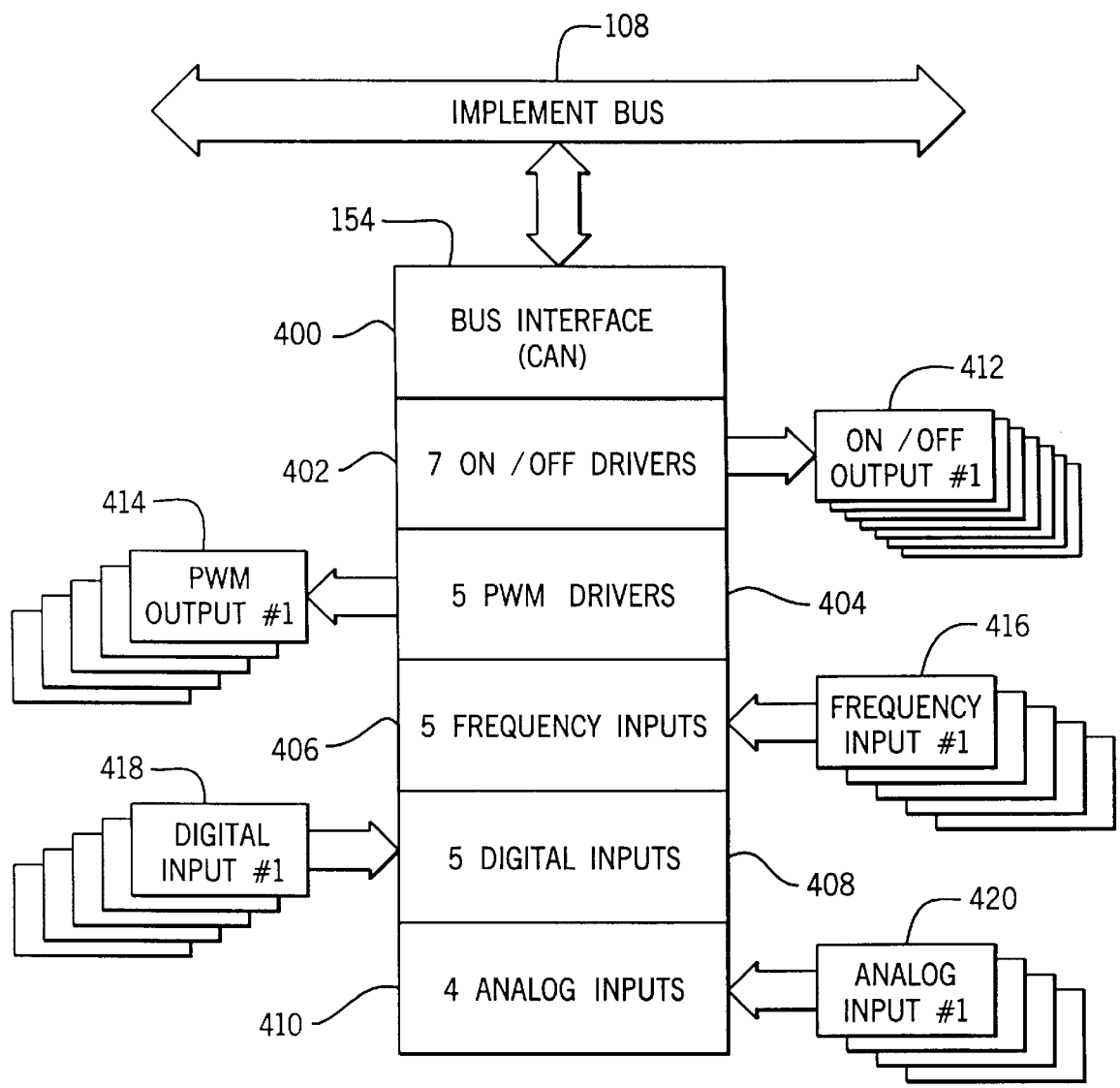
FIG. 8 is a block diagram of one multi-channel controller (MCC) of FIG. 3, and the interfaces between the MCC and other components of the control system.

Control system 100 may be upgraded by installing a removable MCC 154 on each frame section 300 to provide local variable-rate control. Referring to FIG. 8, each MCC 154 includes interfaces 400–410 for implement bus 108, on/off outputs 412 for driving valves, PWM outputs 414 for driving local product metering devices such as cyclo seed meter 32, frequency inputs 416, digital inputs 418, and analog inputs 420. Connections between MCC 154 and control system 100 are shown below. A processor (e.g., an AN80C196CB) coupled to memory circuits (e.g., RAM, EEPROM, Flash EPROM) provides control for MCC 154.

Referring to FIG. 9, another embodiment of control system 100 further provides variable-rate control of the Cyclo Planter. In contrast to FIG. 6, MCCs 154 control the seed application rates of each section 300 based on rate command signals received from CDU 140 via bus 108. Each MCC 154 converts the rate command signals into PWM control signals which are applied to a cyclo seed meter 32 (i.e., drum) on seed module 16 (e.g., the PWM control signals are applied to a hydraulic valve assembly which regulates the flow of hydraulic fluid to motor 38). MCC 154 receives meter feedback speed signals from seed meter 32, and communicates the meter speed feedback data back to CDU 140 for display. MCC 154 could also use the meter speed feedback signals for closed-loop metering control. Each MCC 154 also applies control signals to bin pressure or material flow sensor 288, receives pressure feedback signals from sensor 288, and communicates bin pressure data back to CDU 140 for display.

Referring to FIG. 10, another embodiment of control system 100 further provides variable-rate control of the conventional drill. In contrast to FIG. 7, MCCs 154 control the rates at which seeds are applied by sections 300 using seed rate command signals received from CDU 140. Each MCC 154 converts the rate command signals into rate control signals which are applied to a seed meter 32 on each seed module 16. MCCs 154 receive feedback speed signals from meter 32, and communicate meter speed data back to CDU 140 for display. MCCs 154 can also use the speed feedback signals for closed-loop metering control.

Figure 11A:
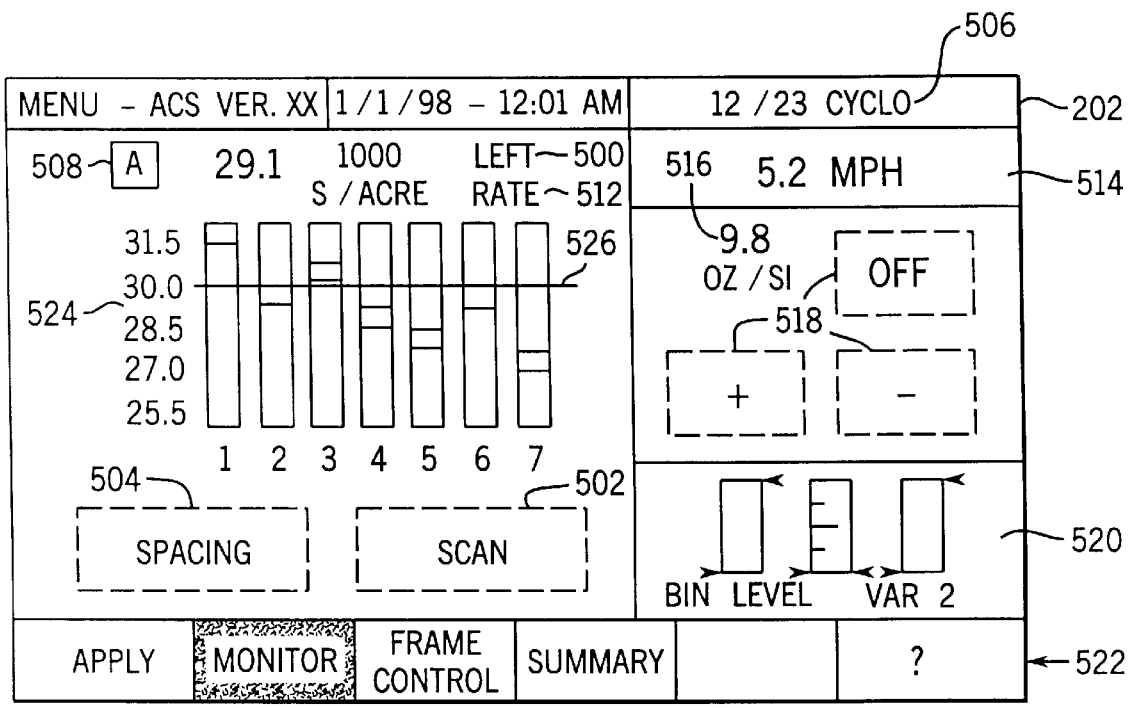
FIGS. 11a–11c show a sequence of CDU display screens allowing the operator to monitor the performance of each section and row unit of the implement, and to determine whether each section and row unit is planting seed at an actual rate consistent with a desired seed planting rate.
Figure 11B:
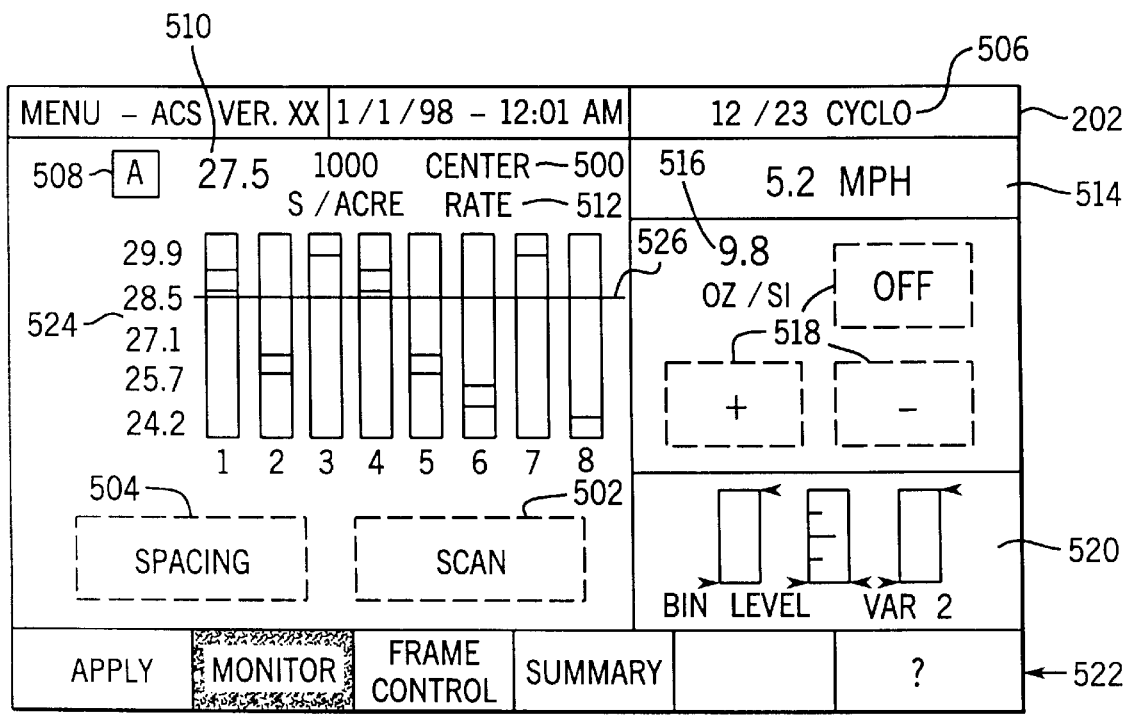
Figure 11C:
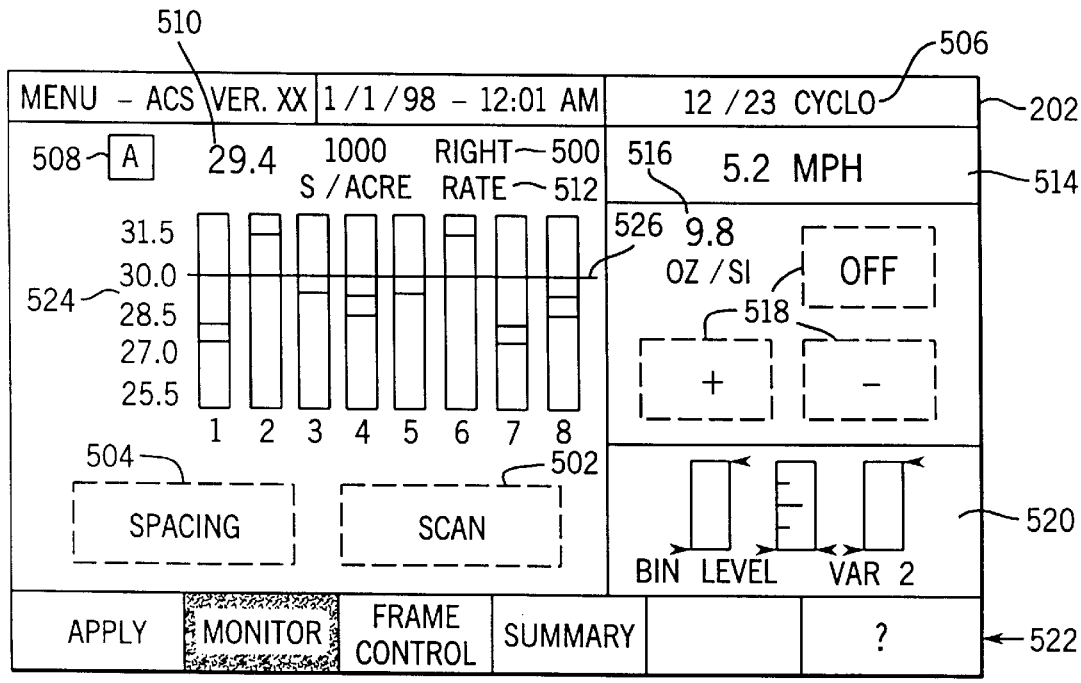

Referring to FIGS. 11a–11c, control system 100 monitors the actual performance of implement 10 and shows actual performance data to the operator on display 202 of CDU 140. To efficiently use the display, performance data for each section 300 of implement 10 is displayed sequentially. The location of the section 300 for which data is currently being displayed is labeled at reference numeral 500. For example, FIGS. 11a, 11b and 11c display performance data for the left, center and right sections 300, respectively, of the Cyclo Planter of FIGS. 6 and 9. The CDU screens for the drill of FIGS. 7 and 10 sequence between left and right sections 300. The performance of implement 10 is scanned by showing data for each section 300 for a predetermined time period (e.g., 2 sec) before showing data for the next section 300. The sections are continually scanned. However, a touch-screen scan switch 502 allows the operator to pause the scan procedure on a selected section 300, and to resume scanning. A second touchscreen switch 504 is used to display seed spacing.

The displayed data includes the implement type 506 (e.g., "12/23 Cyclo"), product type 508 (e.g., "A" for product stored in bin A; "B" for product in bin B, etc.), section average rate 510 (e.g., average delivery rate of 29,100 s/acre across row units 14 of the left section), display identification 512 (e.g., "Rate"), implement speed 514 (e.g., "5.2 mph"), bin pressure 516 (e.g., "9.8 oz/si"), bin pressure controls 518 (e.g., "OFF", "+" and "−"), bin level 520, menu bar 522 and bar graph 524.

Implement type 506 may differ since control system 100 can be programmed for use with different implement types. Implement speed 514 is determined using signals from wheel speed sensor 302 (or radar 126). Bin pressure controls 518 provide control over air pressure in module 16. Bin level 520 displays the height of product in one or more bins 40. Alarm 230 alerts the operator when the lowest bin level is reached. Menu bar 522 allows the operator to select the CDU mode, and includes a "MONITOR" touch-screen switch to select performance monitoring.

Based upon the sensed signals, control system 100 calculates and displays performance monitor data such as planting rate (Seed_Rate), seed spacing (Seed_Spacing), seed metering performance (Seed_Meter_Perf), percent singles metered (%_Singles_Metered), and accumulated metering performance (Accumulated_Meter_Perf). For each data item, CDU 140 displays a section average and a bar graph visually representing data for each row unit 14.

Planting rate is defined as the actual amount of product (e.g., number of seeds) applied over an area (hectare or acre):

Seed_Rate=Seed_Sensor_Count/(Distance_Traveled*Row_Width)

wherein Seed_Sensor_Count is the number of seeds counted by seed sensors 276, Distance_Traveled is the product of ground speed (sensed by wheel speed sensor 302) and time, and Row_Width is the width between row units 14. Seed spacing, displayed in response to actuations of switch 504, is defined as the spacing (cm or in) between seeds:

Seed_Spacing=Distance_Traveled/Seed_Sensor_Count

Seed meter performance is defined as the actual seed delivery rate divided by a theoretical or target rate:

Seed_Meter_Perf=(Seed_Rate/Target_Seed_Rate)*100 wherein Target_Seed_Rate is the target seed rate based upon either a feedback speed signal from meter 32 (e.g., 5 sec average) and the arrangement of the seed drum, or upon the commanded seed planting rate. Percent singles metered is defined as the count from seed sensors 276 of metered seeds passing through seed tube 30 one at a time divided by the total number of seeds over an interval:

%_Singles_Metered=Counted_Singles/(Target_Seed_Rate*Distance_Traveled*Row_Width)

Accumulated meter performance is defined as an operator-resettable running average of the seed meter performance:

Accumulated_Meter_Perf$_n$=(Accumulated_Meter_Perf$_{n-1}$*(n−1)+Seed_Meter_Perf)/n The seed planting rate for n row units 14 of each section 300, averaged over one second and five seconds, respectively, are as follows:

Value=($\Sigma$Seed_Rate$_n$)/n

Section_Average$_n$=(Value$_{n-4}$+Value$_{n-3}$+Value$_{n-2}$+Value$_{n-1}$+Value$_n$)/n The five-second section average ("Section_Average") is used for display (e.g., used for section average rate 510), except that the current seed rate value ("Value") is used for the accumulated meter performance.

Bar graph 524 includes bars (e.g., bars 1–7 in FIG. 11a; bars 1–8 in FIGS. 11b and 11c) showing the planting performance for row units 14 of each section 300 of the 12/23 Cyclo Planter. Five ranges along the vertical axis represent 85%, 90%, 95%, 100% and 105% of a target seed delivery rate, with 100% of the target rate marked by a horizontal line 526. The target rate, set manually or automatically based upon the implement position and a prescription map, may differ for each section 300 during variable-rate application. For example, the target rate is 30,000 s/acre for the left and right sections (FIGS. 11a and 11c), and 28,500 s/acre for the center section (FIG. 11b). Actual delivery rates for row units 14 are shown by the bars on graph 524. Row unit 1 of the left section, for example, has applied seed at an actual rate of 31,500 s/acre. Displaying the actual rate based upon the target rate normalizes the actual seed delivery rate. Thus, bar graph 524 is an easily understood performance monitor for each section and row unit of implement 10 since deviations in rates are represented by differences between horizontal line 526 and the actual rate markers. An operator noticing large deviations between actual and target seed rates can re-adjust or repair implement 10.

As discussed above in relation to FIGS. 11a–11c, control system 100 calculates various statistics associated with the performance of implement 10 and displays these statistics on display 202 of CDU 140. The statistics are displayed on a real-time basis on CDU 140. These statistics include implement status statistics, product rate statistics and application progress statistics.

The implement status statistics which are displayed in FIGS. 11a–11c include implement speed 514, bin pressure 516 and bin level 520. Product rate statistics include section average rate 510, product rate per row (as displayed by the bars on graph 524), product rate per second, product rate per meter, the difference between the targeted product rate per section and the actual product rate per section, and the difference between the targeted product rate per row and the actual product rate per row (as displayed in bar graph 524).

Figure 12:
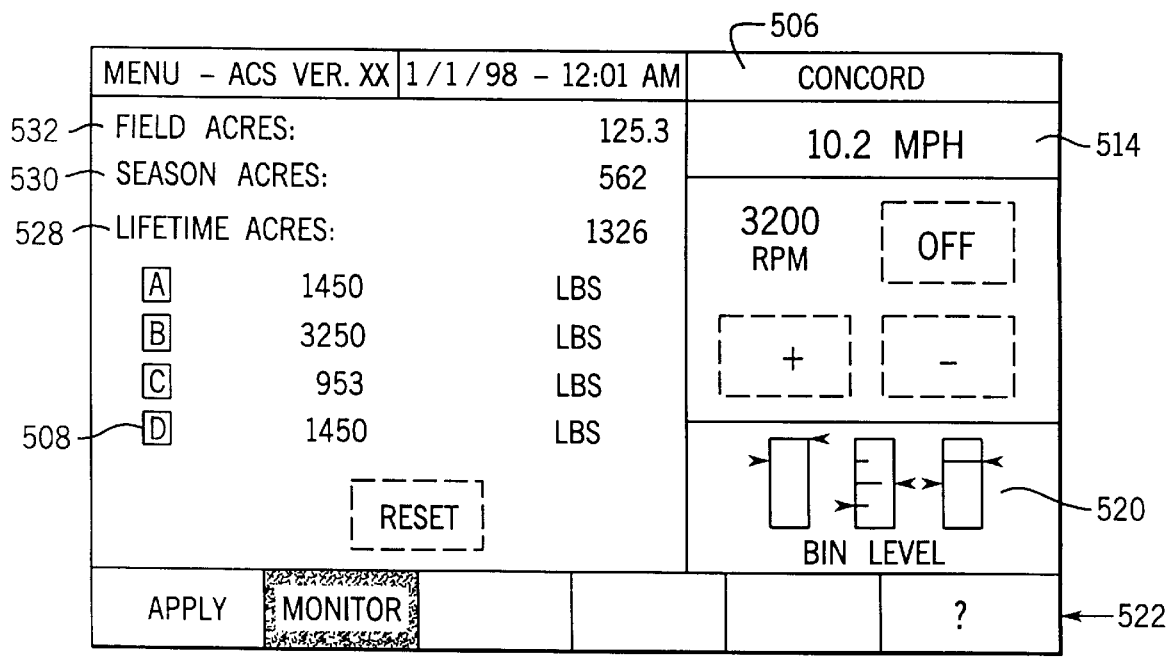
FIG. 12 is a CDU display screen allowing the operator to monitor application progress statistics and evaluate the overall performance of the implement.

Referring to FIG. 12, the application progress statistics calculated by control system 100 and displayed on CDU 140 include the total area (hectares or acres) the system has monitored during its lifetime 528, the total area monitored during the season 530, and the total area monitored in the field 532. The lifetime area counter is non-resettable, while the season area and field area counters are resettable by the operator. The implement performance is monitored during application of seed, and is enabled when the implement status switch 304 indicates that implement 10 is down and the ground speed exceeds a predetermined value (e.g., 0.22 meter/sec). Other application progress statistics include a continuously-updated total of the number of field acres to which the product has been applied and a continuously-updated average of the field acres per hour of product application.

Figure 13:
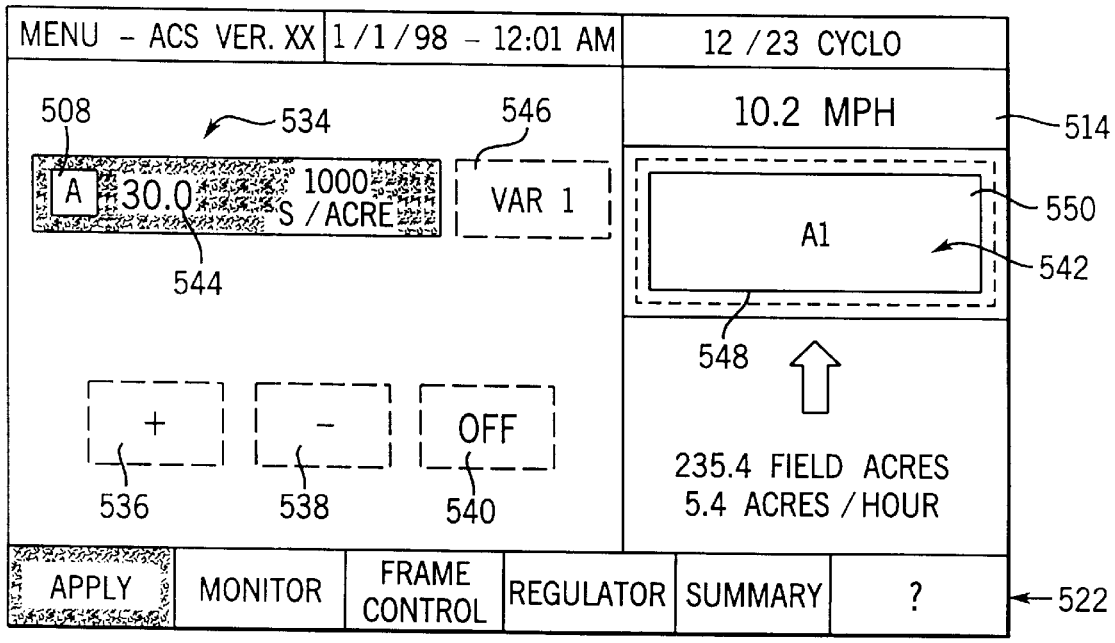
FIG. 13 is a CDU display screen allowing the operator to independently control the target delivery rate of a single product for each section on the implement.
Figure 14:
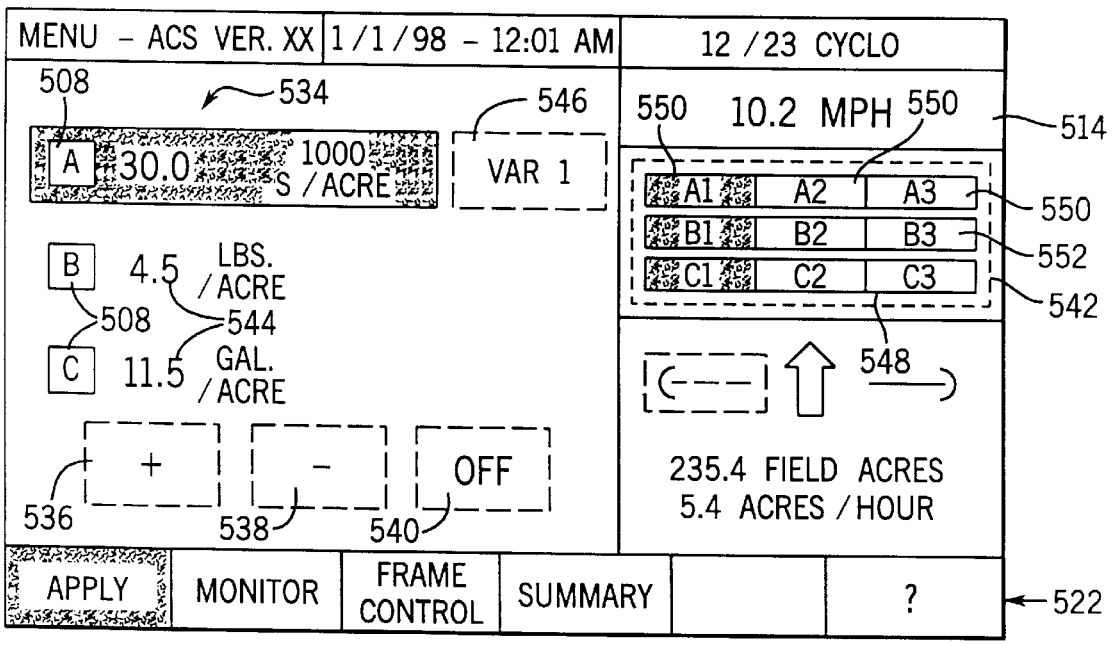
FIG. 14 is a CDU display screen allowing the operator to independently control the target delivery rate of multiple products for each of the sections on the implement.

Referring to FIGS. 13 and 14, an operator independently controls the target delivery rate of a single product 508 (FIG. 13) or multiple products 508 (FIG. 14) for each section 300 of implement 10. The target delivery rate of each product 508 for each section 300 is independent of the target delivery rate of each product for each other section 300. The target delivery rate of each product 508 and the status of each section 300 are controlled by a set of switches displayed on display 202 including a product display area 534, an increment button 536, a decrement button 538, an ON/OFF button 540, and an implement status display area 542.

Product display area 534 includes a single row containing product name 508, product rate data 544 corresponding to product name 508, and a variety indicator 546. Product rate data 544 is an average rate between sections 300 if each section 300 is supported by a separate metering device. The variety of product 508 is selected by pressing on variety indicator 546 to cycle through a series of variety bin numbers. Control system 100 supports manual variable rate product application on four different products simultaneously with up to five sections per product and variety switching with up to four bins per product section.

The target delivery rate of each product 508 is controlled by selecting the single row containing the name of product 508 and selecting increment button 536 to increase the target delivery rate of the selected product, decrement button 538 to decrease the target delivery rate of the selected product, or ON/OFF button 540 to toggle between setting the target delivery rate of the selected product to zero and setting the target delivery rate of the selected product to a previously-targeted delivery rate corresponding to the selected product.

Each product 508 in implement display area 542 is represented by a horizontal bar 548 which is divided into individual boxes 550 representing each section 300 on implement 10. Boxes 550 contain a controller ID 552 representative of product 508 and a section number corresponding to one of the sections (e.g., controller ID B3 represents product B in section 3). Each section 300 is enabled or disabled by selecting controller ID 552 containing the section number to be enabled or disabled. All enabled sections 300 are automatically started when implement 10 is lowered.

Display 202 of CDU 140 displays boxes 550 corresponding to enabled sections predominantly in black and boxes 550 corresponding to disabled sections predominantly in white. If an error condition exists in a section, boxes 550 associated with this section experiencing the error will flash between predominantly black and predominantly white at a rate of 60 cycles per minute.

When a common meter is supporting multiple sections 300, the target delivery rate of product 508 must be incremented or decremented proportionately to the number of sections 300 enabled or disabled. For example, with sections 300 of equal width, if only 2 of the 5 sections for product 508 are enabled, then ⅖ of the target delivery rate will be commanded to the common meter. For sections 300 of unequal width, the following calculation is used:

$$\%ofCommandedRate=100*(SumOfWidthsOfSectionsEnabled/SumOfWidthOfAllSections)$$

While the embodiments illustrated in the FIGURES and described above are presently preferred, it should be understood that these embodiments are offered by way of example only. The control system disclosed herein may be modified for use on other planters, conventional or air drills, other planting implements and material spreaders having variable-rate control, and other electronically-controlled application implements. The invention is not intended to be limited to any particular embodiment, but is intended to extend to modifications that nevertheless fall within the scope of the claims.

What is claimed is:

1. A product application control unit for an agricultural implement coupled to a work vehicle, the work vehicle including a cab and the implement including a frame having a first section and a second section each supporting a plurality of row units, each section configured to apply a primary product to a plurality of rows in a field, the control unit comprising:

an electronic display located in the cab and including a plurality of switches;

a first processor circuit coupled to the electronic display and configured to generate a first application control signal in response to actuations of the plurality of switches of the electronic display;

a second processor circuit coupled to the electronic display and configured to generate a second application control signal in response to the actuations of the plurality of switches of the electronic display;

a first product delivery apparatus coupled to the first processor circuit and configured to control the application of the primary product at the plurality of row units supported by the first section in response to the first application control signal; and a second product delivery apparatus coupled to the second processor circuit and configured to control the application of the primary product at the plurality of row units supported by the second section in response to the second application control signal;

wherein the control unit is capable of controlling the application of the primary product at the plurality of row units supported by the first section independently of the application of the primary product at the plurality of row units supported by the second section.

2. The control unit of claim 1, wherein the control unit controls the application of the primary product at the first section independently of the application of the primary product at the second section by controlling whether the first section is enabled independently of whether the second section is enabled.

3. The control unit of claim 1, wherein the control unit is also configured to apply a secondary product at a plurality of row units supported by the first and second sections, and the control unit is capable of controlling the application of the secondary product independently of the application of the primary product.

4. The control unit of claim 3, wherein the secondary product is applied at row units supported by each of the first and second sections, and the control unit is capable of controlling the application of the secondary product at the row units supported by the first section independent of the application of the secondary product at the row units supported by the second section.

5. The control unit of claim 3, further comprising a third product delivery apparatus coupled to the first processor circuit and configured to control the application of the secondary product at the row units supported by the first section, wherein the first processor circuit is configured to generate a third application control signal in response to the actuations of the plurality of switches of the electronic display, and wherein the third product delivery apparatus controls the application of the secondary product in response to the third application control signal.

6. The control unit of claim 3, further comprising a third processor circuit coupled to the electronic display and configured to generate a third application control signal in response to the actuations of the plurality of switches of the electronic display, and a third product delivery apparatus coupled to the third processor circuit and configured to control the application of the secondary product at the row units supported by at least one of the first and second sections, wherein the third product delivery apparatus is configured to control the application of the secondary product in response to the third application control signal.

7. The control unit of claim 1, further comprising a plurality of electronic product sensors coupled to the first processor circuit and to the first section, each of the electronic product sensors configured to sense the rate of application of the primary product at a respective row unit supported by the first section, and to generate a respective product rate signal representative thereof.

8. The control unit of claim 7, wherein the electronic product sensors coupled to the first section provide the respective product rate signals to the first processor circuit, the first processor circuit generates and applies a display signal to the electronic display based upon the product rate signals, and the electronic display produces an image based upon the display signal.

9. The control unit of claim 8, wherein the image produced by the electronic display includes a bar graph with a plurality of bars respectively indicative of the rates of application of the primary product at respective row units of the first section.

10. The control unit of claim 9, wherein the image produced by the electronic display includes a target rate indicator aligned across the bars of the bar graph that allows for easy comparison of the rates of application with a target delivery rate represented by the target rate indicator.

11. The control unit of claim 10, wherein the image produced by the electronic display includes an indication of an average rate of application of the primary product, wherein the average rate of application equals the average of the respective rates of application of the primary product at the plurality of row units of the first section.

12. The control unit of claim 1, wherein the electronic display produces an image in response to the actuations of the plurality of switches, the image being indicative of a target rate of delivery of the primary product at the row units of at least one of the first and second sections.

13. The control unit of claim 12, wherein the target rate of delivery increases in dependence upon actuations of an increment switch and decreases in dependence upon actuations of a decrement switch, and the electronic display also is capable of receiving actuations from an ON/OFF button, wherein selecting the ON/OFF button toggles between setting the target delivery rate of the primary product to zero and setting the target delivery rate of the primary product to a previously targeted delivery rate.

14. The control unit of claim 12, wherein the electronic display is capable of receiving actuations from a product display area that includes a single row containing a product name, product rate data corresponding to the product name, and a variety name area.

15. The control unit of claim 1, wherein the electronic display produces an image that includes an implement display area having a plurality of bars corresponding to a plurality of products the application of which is controlled by the control unit, the plurality of products including at least the primary product and a secondary product, each of the bars of the implement display area further being divided into a plurality of boxes, the boxes of each bar corresponding respectively to a plurality of sections including at least the first and second sections, such that the implement display area forms a matrix indicative of whether each of the sections is enabled or disabled with respect to the application of each of the products.

16. The control unit of claim 15, wherein the electronic display is a touch screen, and the matrix formed by the implement display area is a switching matrix by which a particular section may be enabled or disabled with respect to the application of a particular product at that section.

17. The control unit of claim 1, wherein the electronic display is capable of producing images displaying implement status statistics, product rate statistics and application progress statistics.

18. The control unit of claim 1, wherein the primary product is selected from the group consisting of seed, fertilizer, insecticide and herbicide.

19. A product application control unit for an agricultural implement coupled to a work vehicle, the work vehicle including a cab and the implement including a frame having a plurality of sections each supporting a plurality of row units, each section configured to apply a plurality of products to a plurality of rows in a field, the control unit comprising:

display means located in the cab for producing an image, receiving operator inputs and providing output signals in response to the operator inputs;

first processor means coupled to the display means for generating first control signals in response to the output signals;

second processor means coupled to the display means for generating second control signals in response to the output signals;

first product distribution means coupled to the first processor means for controlling the application of at least one of the plurality of products at the plurality of row units supported by at least one of the sections, the first product distribution means controlling the application of the at least one product in response to the first control signals; and second product distribution means coupled to the second processor means for controlling the application of at least one of the plurality of products at the plurality of row units supported by at least one of the sections, the second product distribution means controlling the application of the at least one product in response to the second control signals;

wherein the control unit is capable of controlling the application of one of the products at one of the sections independently of the application of that product at any other of the sections.

20. In a work vehicle including a cab and coupled to an implement having a first section and at least one additional section, wherein each of the sections includes a plurality of row units, a method of controlling the amount of a product delivered at the first section of an agricultural implement independently of the amount of the product delivered at the at least one additional section of the agricultural implement, the method comprising the steps of:

receiving an actuation at a switch on an electronic display;

generating an application control signal in response to the actuation;

providing the application control signal to a particular product delivery apparatus configured to control the application of the product at the first section but not to control the application of the product at the at least one additional section; and controlling the application of the product at the first section in response to the application control signal, wherein such controlled application is independent of the application of the product at the at least one additional section.

* * * * *